(12) United States Patent  (10) Patent No.: US 7,369,044 B2
Ono et al.  (45) Date of Patent: May 6, 2008

(54) DISPLAY APPARATUS FOR VEHICLE

(75) Inventors: Shunsuke Ono, Shizuoka (JP);
Masahiro Muramatsu, Shizuoka (JP);
Yoshiharu Matsuo, Shizuoka (JP);
Hiroyuki Yokota, Shizuoka (JP);
Satoshi Saotome, Shizuoka (JP);
Takeshi Matsumura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 252 days.

(21) Appl. No.: 11/051,626

(22) Filed: Jan. 27, 2005

(65) Prior Publication Data

US 2005/0212669 A1   Sep. 29, 2005

(30) Foreign Application Priority Data

Jan. 28, 2004  (JP) ............................. 2004-020064
Nov. 2, 2004  (JP) ............................. 2004-318860

(51) Int. Cl.
*B60Q 1/00* (2006.01)

(52) U.S. Cl. .................... 340/461; 340/462; 345/7; 345/23; 345/29; 345/156; 345/644

(58) Field of Classification Search ............... 340/461, 340/462, 451; 345/7, 23, 29, 156, 644
See application file for complete search history.

(56) References Cited

U.S. PATENT DOCUMENTS

| | | | | |
|---|---|---|---|---|
| 2,686,455 A | * | 8/1954 | Porsche | ........................ 353/14 |
| 4,973,942 A | * | 11/1990 | Iino | ............................ 340/438 |
| 5,229,754 A | * | 7/1993 | Aoki et al. | ..................... 345/9 |
| 5,461,361 A | * | 10/1995 | Moore | ......................... 340/461 |
| 5,949,330 A | * | 9/1999 | Hoffman et al. | ............ 340/438 |
| 6,115,008 A | * | 9/2000 | Palalau et al. | ................. 345/7 |
| 6,621,471 B1 | * | 9/2003 | Ozaki et al. | .................... 345/4 |
| 6,667,726 B1 | * | 12/2003 | Damiani et al. | ............. 345/1.1 |
| 6,693,522 B2 | * | 2/2004 | Tang et al. | ................. 340/445 |
| 6,966,663 B2 | * | 11/2005 | Wada et al. | .................. 362/29 |
| 2004/0189446 A1 | * | 9/2004 | Fournier | .................. 340/425.5 |

FOREIGN PATENT DOCUMENTS

| | | |
|---|---|---|
| DE | 40 42 438 C2 | 11/1990 |
| DE | 195 29 390 A1 | 2/1997 |
| DE | 197 57 564 A1 | 7/1999 |
| DE | 198 16 018 A1 | 10/1999 |
| DE | 200 05 647 U1 | 3/2000 |
| DE | 200 05 647 U1 | 6/2000 |

(Continued)

OTHER PUBLICATIONS

English translation of German Office Action.

(Continued)

*Primary Examiner*—Jeffery Hofsass
*Assistant Examiner*—Edny Labbees
(74) *Attorney, Agent, or Firm*—Finnegan, Henderson, Farabow, Garrett & Dunner, L.L.P.

(57) ABSTRACT

A display apparatus for a vehicle includes display screen having a plurality of display areas such as a tachometer display area, a speedometer display area, and an auxiliary display area. The display apparatus for a vehicle further includes a CPU for controlling images displayed on the display screen. A display partition member is mounted on a part of the display screen.

9 Claims, 17 Drawing Sheets

FOREIGN PATENT DOCUMENTS

| | | |
|---|---|---|
| DE | 199 03 201 A1 | 8/2000 |
| DE | 100 46 019 A1 | 3/2002 |
| DE | 102 54 437 A1 | 11/2003 |
| DE | 102 29 875 A1 | 2/2004 |
| DE | 200 05 647 U1 | 3/2007 |
| JP | 62-058112 | 3/1987 |
| JP | 11-248490 | 9/1999 |

OTHER PUBLICATIONS

English translation of German Office Action, Apr. 12, 2006.

* cited by examiner

DISPLAY APPARATUS FOR VEHICLE

BACKGROUND OF THE INVENTION

The priority application Number Japanese Patent Application 2004-318860 upon which this patent application is based is hereby incorporated by reference.

1. Field of the Invention

This invention relates to a display apparatus for a vehicle.

2. Description of the Related Art

As shown in FIGS. 24A and 24B, Japanese published unexamined patent application No. Sho 62-58112 discloses a conventional display apparatus for a vehicle. FIG. 24A is an overall schematic view of the conventional display apparatus, and FIG. 24B is a schematic view showing an example image displayed on a display screen of the conventional display apparatus. FIG. 24A shows a dashboard 120, a steering 121, and a display screen 122 mounted on the dashboard 120. The display screen 122 includes a fixed display area 123 on which fixed data is normally displayed, and a multiple display area 124 showing a plurality of images, for example, three images selectively by a change-over switch. These images displayed on the multiple display area 124 are, for example, an image including mainly a tachometer, an image having substantially all items normally displayed on the dashboard of a vehicle, and a safety monitor image.

FIG. 24B shows the screen image 124a including mainly a tachometer 125. A tachometer 125, namely, a rotation meter of an engine, and a torque split meter 126 to indicate a torque distribution between front and rear wheels in a four wheel drive car are arranged in the screen image 124a. A turbo boost meter 127, a coolant temperature meter 128, and a fuel meter 129 are arranged in a lower part of the image 124a.

As shown in FIGS. 25A and 25B, a display area 141 of the screen image 124, on which the torque split meter 126 is displayed, is assigned to display also a warning symbol to indicate a trouble currently occurred.

For example, an enlarged warning symbol 142 indicating a shortage of brake fluid is displayed on the display area 141 instead of the torque split meter 126.

Further, as shown in FIG. 25B, after a lapse of a specific time from a new waning, both the torque split meter 126 and a miniature 142' of the warning symbol are displayed on the display area 141.

Japanese published unexamined patent application No. Hei 11-248490 discloses another conventional display apparatus for a vehicle.

FIG. 26 shows a vertical sectional side view of the another conventional display apparatus for a vehicle disclosed in the another document. FIG. 27A is a front view showing an example image having analog meters displayed on a display screen of the another conventional display apparatus for a vehicle. FIG. 27B is a front view showing an example image having some of the analog meters and car-navigation information displayed on the display screen of the another conventional display apparatus for a vehicle. The display apparatus for a vehicle shown in FIG. 26 is used for a combination of meters in a vehicle. A bezel 216 and a front pane 217 are provided in front of a meter case 201.

An LCD panel 202 is provided inside the meter case 201. A controller 203 and a transparent EL panel 204 are respectively provided at a back and in front of the LCD panel 202.

As an embodiment shown in FIG. 27A, the LCD panel 202 displays background dial images 210, including graduations and characters, as analog meters of the combination, for example, a speedometer 205, a tachometer 206, a fuel meter 207, and a temperature meter 208. The LCD panel 202 also displays a shift indicator 211 in a center thereof. In another embodiment shown in FIG. 27B, the LCD panel 202 displays a car navigation information 212, a warning message 213, and the like in a left screen thereof.

The transparent EL panel 204 is generally used for a flat panel display. The transparent EL panel 204 is normally transparent, and displays characters and images at a specific area with specific colors by the controller 203. In this case, a pointer 205 is displayed on the EL panel 204. Namely, a dial image as a background is displayed on the LCD panel 202, and the pointer 215 is displayed on the EL panel 204 provided in front of the LCD panel 202. Thus, an analog meter image produces a stereoscopic effect like a pointer moving on a conventional meter.

However, even the conventional display apparatus for a vehicle as shown in FIGS. 24A, 24B, 25A and 25B can display various images, there is a problem that those images are flat, less vivid overall.

On the other hand, images displayed on the other conventional display apparatus for a vehicle as shown in FIGS. 26, 27A and 27B produce a stereoscopic effect, however, there is a problem that such an apparatus costs a lot because of using the expensive EL panel 204 for displaying the pointer 215.

Accordingly, it is an object of this invention to provide a low-cost display apparatus for a vehicle that displays a vivid, stereoscopic image.

SUMMARY OF THE INVENTION

In order to attain the object, according to this invention, there is provided a display apparatus for a vehicle comprising:

a display screen having a plurality of display areas on which data indicating various conditions of the vehicle are displayed; and a controller for controlling images displayed on the display screen, whereby a partition member is mounted on a part of the display area.

Preferably, the display areas include a meter display area on which a dial plate image indicating a measured value representing one aspect of a vehicle driving condition; and an auxiliary display area on which other information except the measured value is displayed. In addition, the partition member is mounted on a part of the meter image area.

Preferably, the partition member is a transparent material formed to have a lens effect.

Preferably, the partition member is made of a plastic material.

Preferably, both sides of the partition member made of the plastic material are metalized.

Preferably, the controller so controls as to normally extend a pointer image for indicating the measured value from the meter image area to the auxiliary display area, and as to shorten the pointer image when the other information except the measured value is displayed on the auxiliary display area.

Preferably, images displayed on the auxiliary display area are gradated.

Preferably, the partition member is a ring member having an opening at the center, and a lens is mounted at the center opening of the partition member.

In the display apparatus having the lens mounted on the partition member, preferably, the controller controls to compensate a distortion caused by aberration of the lens, of an image on the display screen viewed through the lens.

In the display apparatus having the lens mounted on the partition member, preferably, the partition member is made of an opaque plastic material, or a metal.

The above and other objects, features, and advantages of this invention will be better understood when taken in connection with the accompanying drawings and description.

DESCRIPTION OF THE PREFERRED EMBODIMENTS

First Embodiment

A first embodiment of a display apparatus for a vehicle according to this invention will be explained below with reference to Figures.

Figure 1:
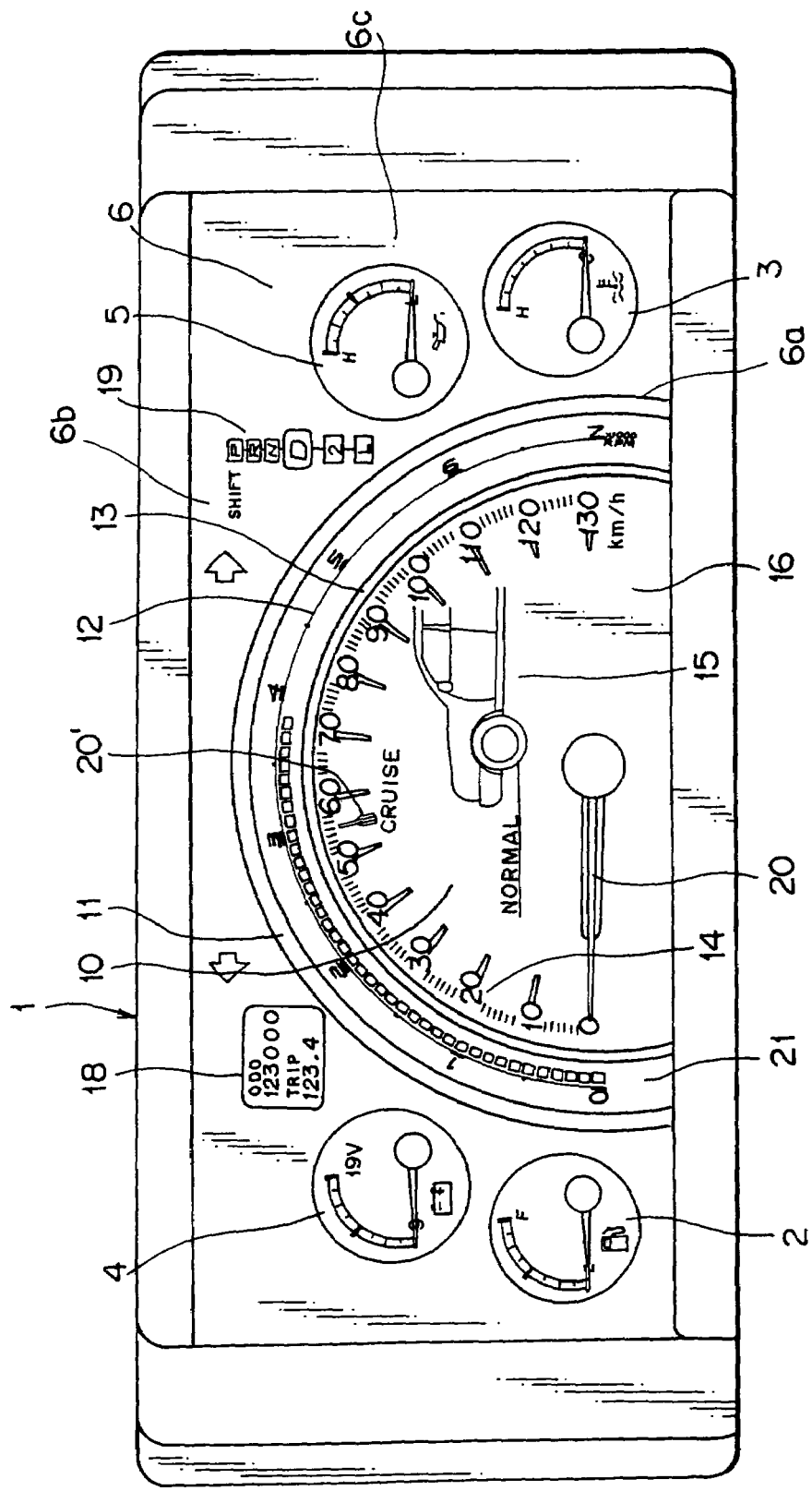
FIG. 1 is a front view showing a first embodiment of a display apparatus for a vehicle according to this invention.

As shown in FIG. 1, a display meter 10 is arranged in the front center of a display apparatus for a vehicle 1. A fuel meter 2, a coolant temperature meter 3, a voltage meter 4, and an oil pressure meter 5, as independent analog meters, are arranged around the display meter 10.

The display meter 10 is made of any one of an LCD panel, an EL panel, a CRT, and the like. In this first embodiment, the LCD panel is used. Various data indicating a state of the vehicle is displayed on a display screen 16 of the display meter 10.

A substantially circular image displayed on the display screen 16 corresponding to a dial plate indicating a running state of the vehicle includes an outer border line 11, a tachometer display area 12, a separator 13, and a speedometer display area 14. An auxiliary display area 15 for displaying data such as a warning, except measuring data such as the speedometer and the tachometer, is provided inside the speedometer display area 14. A pointer 20 is displayed extending from the speedometer display area 14 to the auxiliary display area 15.

An odometer and trip meter display area 18 is provided on a left side of the substantially circular image. A shift indicator display area 19 is provided on a right side of the substantially circular image.

Figure 2:
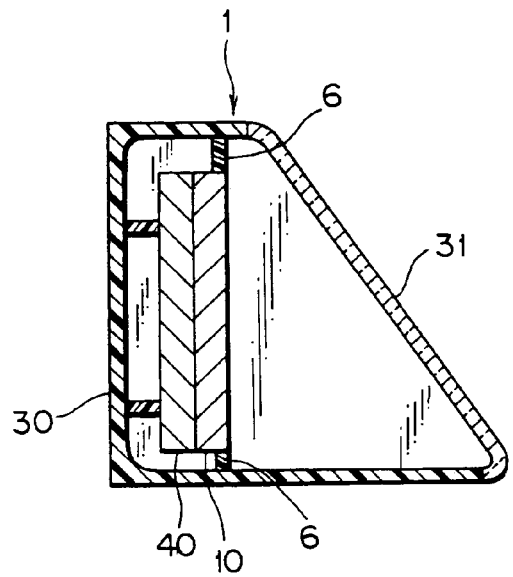
FIG. 2 is a schematic sectional view showing an interior of the display apparatus according to the first embodiment of this invention.

As shown in FIG. 2, the above-described analog meters and the display meter 10 are accommodated in an inner space formed by a meter case 31 and a front pane 31 attached to the meter case 31. A control board 40 is provided on a rear surface of the display meter 10. Further, a bezel 6 is provided between the display meter 10 and the analog meters. As shown in FIG. 1, in the bezel 6, a hole (or a notch) 6a is provided along an outer periphery of the outer border line 11 to allow display areas of the display meter 10 surrounded by the outer border line 11 to be seen directly. Further, in the bezel 6, areas 6b overlapping the odometer and trip meter display area 18 and the shift indicator display area 19 are transparent, and areas 6c as backgrounds surrounding the analog meters, such as the fuel meter 2, are painted black.

Figure 3:
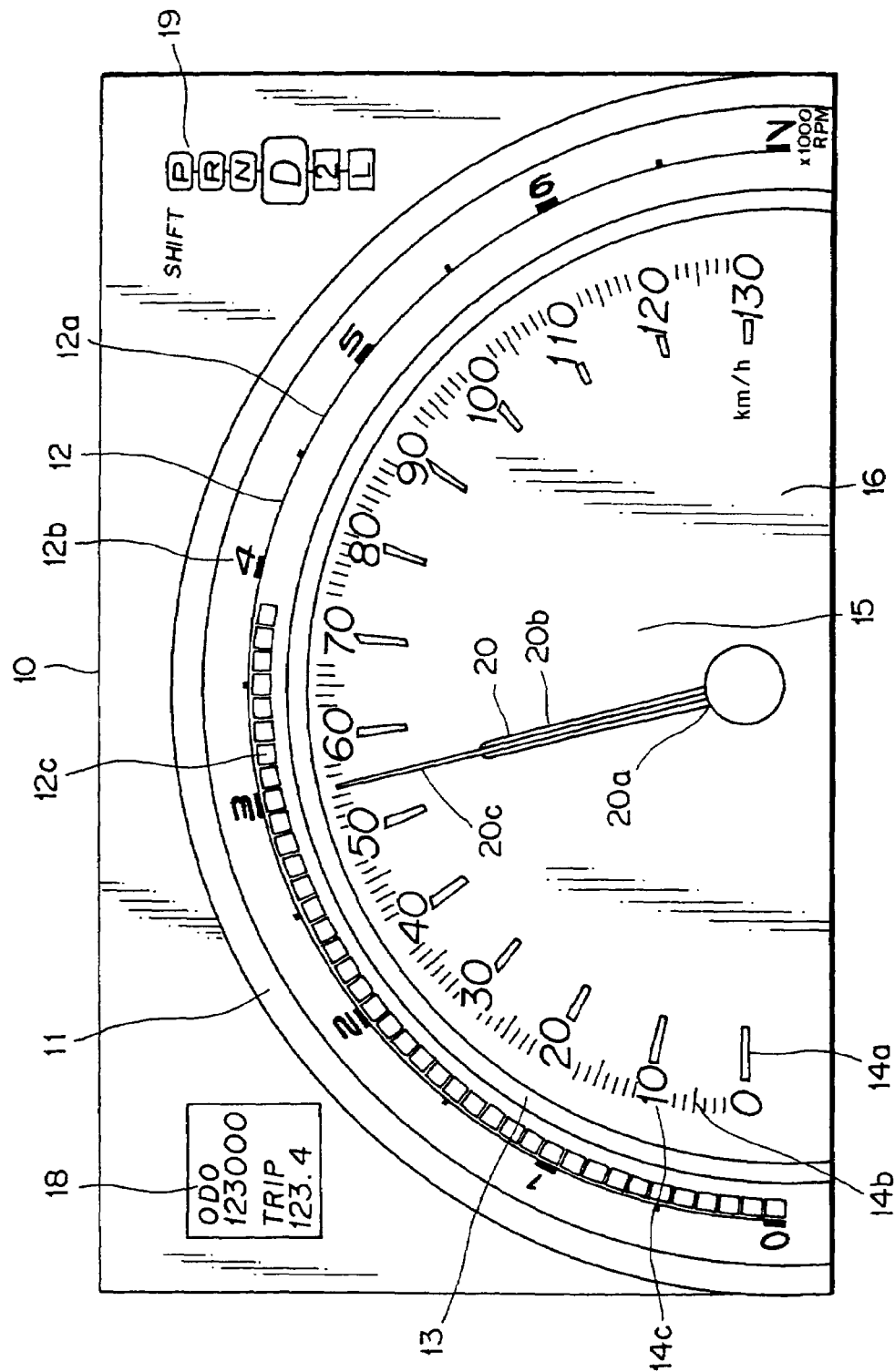
FIG. 3 is an example image displayed on a display screen of the display apparatus according to the first embodiment of this invention.

As shown in FIG. 3, a normal image displayed on the auxiliary display area 15 of the display meter 10 includes a long pointer 20 without a waning symbol and the like. This long pointer 20 includes a base part 20a at a lower end of the long pointer 20, a wider middle part 20b extending from the base part 20a, and a narrower top end part 20c extending from the middle part 20b.

Heavy-line Graduations 14a extending in a radial direction of the substantially circular image displayed on the display screen 16 corresponding to a dial plate, fine-line graduations 14b also extending in the same radial direction, and characters 14c indicating values of corresponding heavy-line graduations are displayed in the speedometer display area 14. An analog speedometer image is configured with these graduations 14a, 14b, 14c and the pointer 20.

The pointer 20 is displayed rotatably around the base part 20a. The top end part 20c indicates the above-described graduations 14a, 14b, 14c to indicate a speed of the vehicle. For example, the speedometer image in FIG. 3 indicates a speed of about fifty-five kilometers per hour.

A bar-graph indicator pattern 12a having a substantially semi-circular border line and graduations extending in a radial direction of the substantially semi-circular border line, and characters 12b are displayed in the tachometer display area 12. Further, segments 12c indicating number of rotations of an engine are displayed between the bar-graph indicator pattern 12a and the separator 13. Each of these segments 12c has a substantially square shape. A number of displayed segments 12c corresponds to the number of the rotations of the engine. For example, the tachometer in FIG. 3 indicates about three thousand and eight hundred rotations of the engine.

Figure 4:
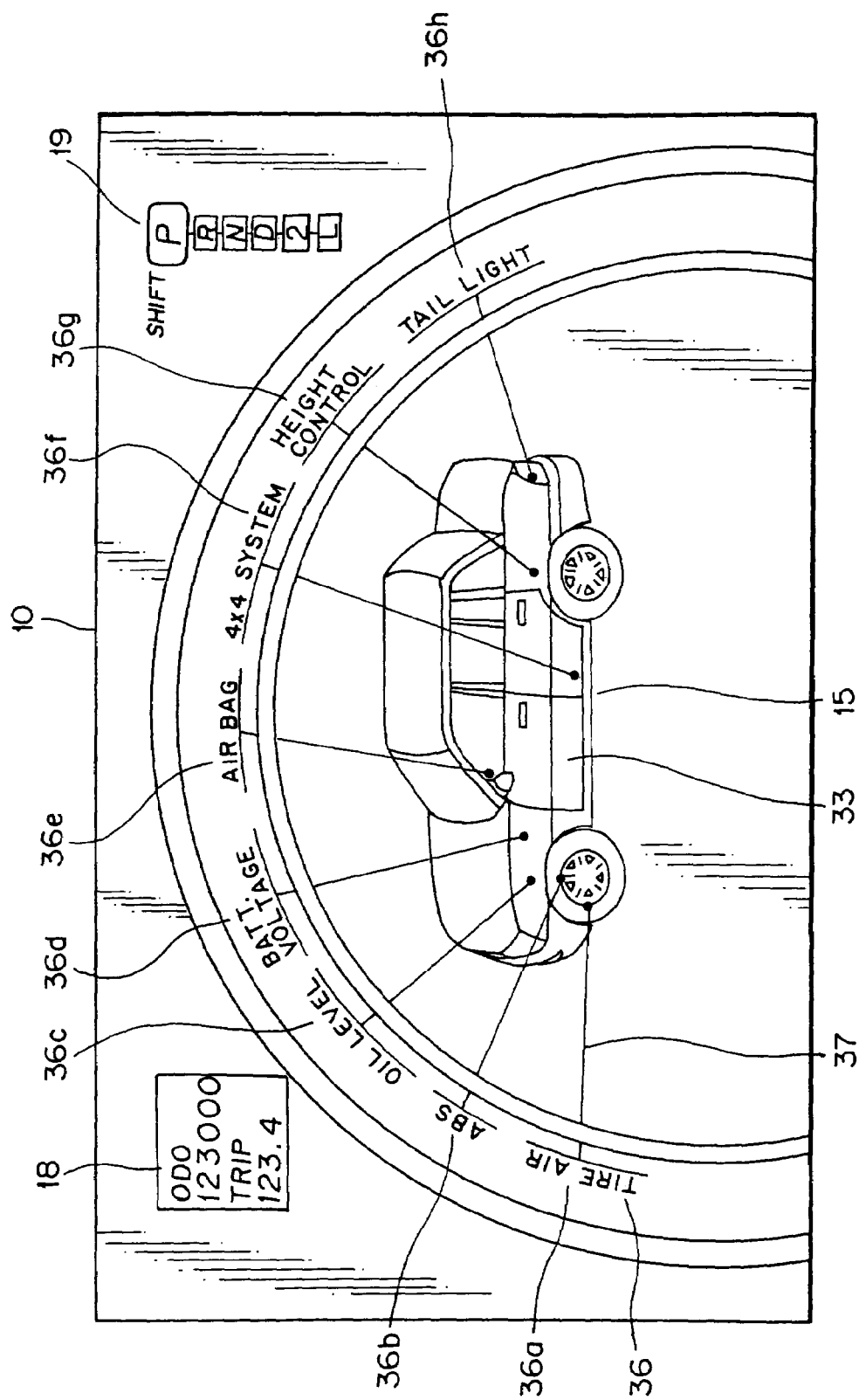
FIG. 4 is another example image displayed on the display screen of the display apparatus according to the first embodiment of this invention.

As shown in FIG. 4, the display meter 10 can alternatively display the above-described tachometer and speedometer data, and other data, such as diagnostic data 36, in a whole area of the display meter 10 including the tachometer display area 12, the speedometer display area 14, and the auxiliary display area 15. This diagnostic data 36 indicates diagnoses on items such as air pressures in tires 36a, an anti brake system (ABS) 36b, an oil level 36c, a battery voltage 36d, an air bag 36e, a four by four system 36f, a height control 36g, and tail lights 36h. Each of the diagnostic items is so displayed as to be connected by a lead line 37 with a vehicle image 33 displayed in the auxiliary display area 15.

Further, as shown in FIG. 1, when some data such as the warning is displayed in the auxiliary display area 15, the pointer 20 is replaced with the shorter pointer 20' extending from substantially the same top end part 20c. Owing to the shorter pointer 20', the data displayed on the auxiliary display area 15 is prevented from being disturbed by the pointer 20' and visibility of the data on the display area 15 is improved.

Figure 5:
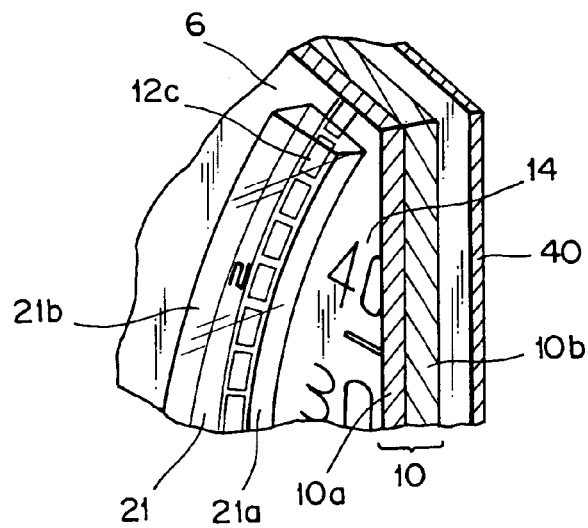
FIG. 5 is a partially enlarged perspective view of the display apparatus according to the first embodiment of this invention.

As shown in FIG. 5, a substantially arc-shaped display partition member 21 having specific width and thickness, and being made of a transparent plastic material such as acrylic resin, is fixed on a periphery of a front surface of the tachometer display area 12 by such as a not-shown transparent adhesive.

Figure 6:
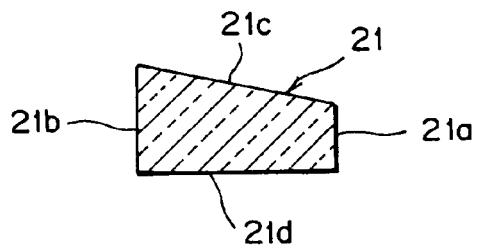
FIG. 6 is a sectional view of a partition member in FIG. 5 according to the first embodiment of this invention.

As shown in FIG. 6, this display partition member 21 having the arc shape includes a lower sidewall 21a at an inside of the arc and a higher sidewall 21b at an outside of the arc. Thereby, a fat arc-shaped top surface 21c of the display partition member 21 is inclined inward to the tachometer display area 12 against a bottom surface 21d fixed on the periphery of the front surface of the tachometer display area 12.

Thus, the display partition member 21 makes an outline of an outer periphery of the display meter 10 visually clear. Further, since the display partition member 21 projects from the flat surface of the display meter 10, the bar-graph indicator pattern 12a, the characters 12b, and the segments 12c on the tachometer display area 12 are stereoscopically isolated from the other display areas, images on the display screen 16 are displayed stereoscopic and sharp. Further, the display partition member 21 has a conical shape as a whole with the inclined top surface 21c. Therefore, the tachometer display area 12 looks deeper than it really is, and the images displayed on the display screen 16 are displayed more stereoscopically.

Figure 7:
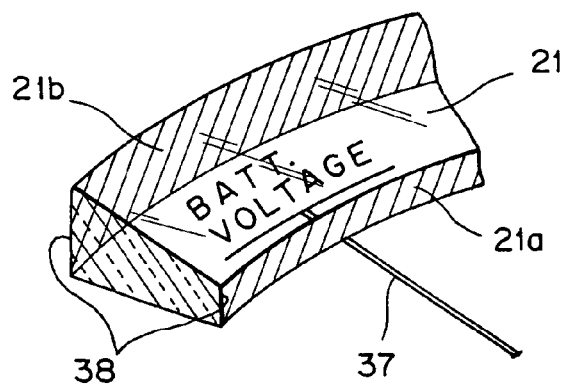
FIG. 7 is a perspective view showing a main part in FIG. 5 according to the first embodiment of this invention.

As shown in FIG. 7, each of the both sidewalls 21a, 21b has a metallic coat 38 made of such as aluminum. The coat 38 is produced by evaporating, coating or the like. Such a metallic coat 38 makes the outlines of the both side walls 21a, 21b clear, and produces a novel appearance that the lead lines 38 appears to protrude the sidewall 21a when the diagnostic data 36 is displayed.

Figure 8:
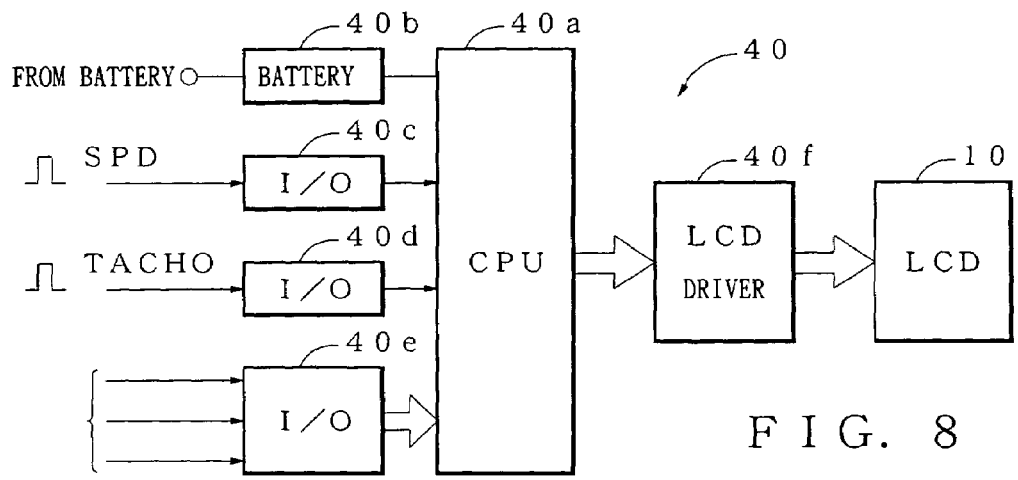
FIG. 8 is a block circuit diagram of the display apparatus according to the first embodiment of this invention.

FIG. 8 is a main block circuit diagram of a controller 40 mounted on a not-shown control board for controlling a display of the display meter 10. This controller 40 includes a CPU 40a; a power supply circuit 40b connected to a not-shown battery for supplying the proper power to the CPU 40a; a first input/output circuit 40c for receiving a vehicle speed detecting (SPD) signal from a not-shown vehicle speed sensor; a second input/output circuit 40d for receiving an engine rotation number (TACHO) signal from a not-shown engine rotation sensor; a third input/output circuit 40e for receiving signals from the other sensors; an LCD driver 40f for receiving various display signals calculated and outputted by the CPU 40a from the above-described signals; and a TFT-LCD panel (display meter 10) driven by the LCD driver 40f.

Figure 9:
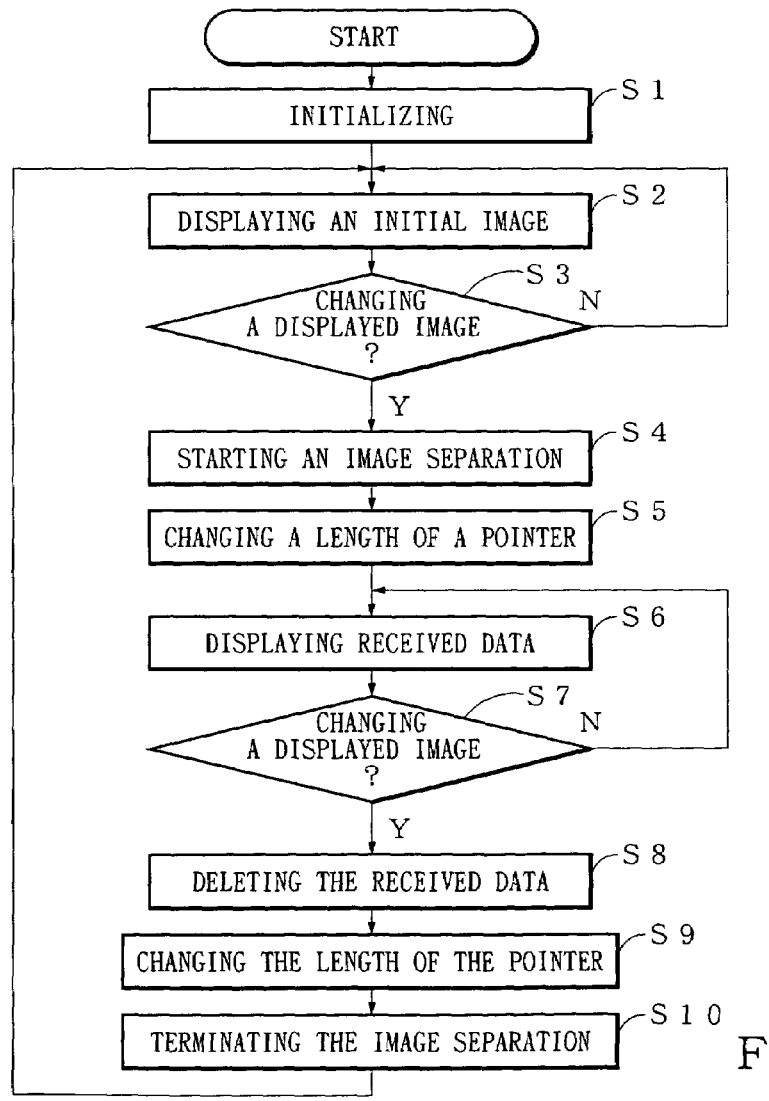
FIG. 9 is a flow chart showing data processing flow of the display apparatus according to the first embodiment of this invention.

A process flow of the CPU 40a will be explained with reference to FIG. 9. At first, in step S1, when the power of the display apparatus for a vehicle 1 is on, each part of the controller 40 is initialized. Next, in step S2, an initial image such as the image in FIG. 1 is displayed on the display screen 16 of the display meter 10. Namely, for example, the segments 12c indicating number of rotations of the engine are displayed, and the pointer 20 is rotated according to the vehicle speed.

Next, in step S3, the CPU 40a judges whether or not to change the displayed image according to the signals from the various sensors. If the CPU 40a judges that the image has not to be changed, the process flow returns to step S2. On the other hand, if the CPU 40a receives such as a warning, and judges that the image has to be changed, an image separation is started in step S4. This image separation means separating a pointer 20 displaying area from the auxiliary display area 15.

Figure 10A:
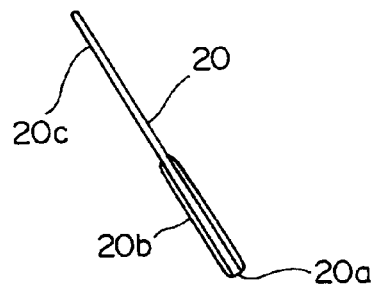
FIGS. 10A, 10B, and 10C are explanatory views showing various pointer images according to the first embodiment of this invention.
Figure 10B:
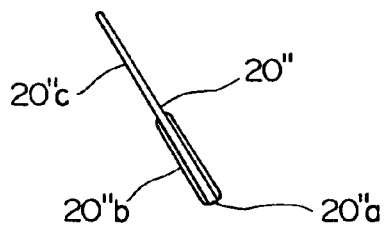
Figure 10C:
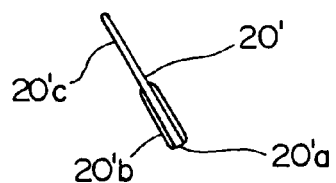

Next, in step S5, the pointer 20' in the screen image is shortened. As shown in FIG. 10, the pointer 20' is shortened gradually from a longer pointer 20 in FIG. 10A, to a middle pointer 20" in FIG. 10B, and finally to a short pointer 20' in FIG. 10C, in a manner that a position of the top end part 20c' is unchanged, and the base part 20a' approaches to the top end part 20c'. Thus, a vehicle driver can see these continuous changes of the pointer length. For example, the pointer images shown in FIGS. 10A and 10B and the pointer images shown in 10B and 10C are respectively overlapped with each other.

Next, in step S6, received data such as the warning in step S3 is displayed on the auxiliary display area 15. Next, in step S7, the CPU 40a judges again whether or not to change the displayed image. If the CPU 40a judges that the displayed image has not to be changed, the process flow returns to step S6. On the other hand, if the CPU 40a receives data such as a cancellation of the warning, the CPU 40a judges that the displayed image has to be changed and delete the data displayed on the auxiliary display area 15 in step S8.

Next, in step S9, the pointer 20 is elongated. At last, the image separation is terminated in step S10.

Thus, according to this invention, normal meter images such as the speedometer, the tachometer, and the other sub images are displayed simultaneously, visibly, and comfortably. Further, since both the long and short pointers 20, 20' can be displayed alternatively, the display screen 16 produces a novel appearance.

Now, the first embodiment of this invention is fully explained. Incidentally, this invention is not limited to the first embodiment described above. Various embodiments can be adopted to this invention.

For an example, in the first embodiment, the top surface 21c of the display partition member 21 is a flat inclined surface. However, the top surface 21c may be a curved surface or a curved surface having a magnifying lens effect. Further, only one display partition member 21 is mounted on the tachometer display area 12 in the first embodiment. However, a plurality of display partition members may be mounted, for example, concentrically. Further, a curved surface having a magnifying lens effect may be provided on a part of the display partition member 21.

Further, the auxiliary display area 15 may be gradated. For example, a gradation that an outer periphery of the auxiliary display area 15 is bright, and the auxiliary display area 15 becomes darker toward the center thereof, emphasizes a stereoscopic effect that the auxiliary display area 15 seems to be sinking toward the center thereof.

Further, in the first embodiment, a displayed speed unit is km/h, but may be mph. Further, design of the dial image can be modified according to uses, destinations, and specifications. A various images may be previously stored in an internal memory of the CPU 40a, for example, as bit-map images, and loaded selectively and properly.

Further, in the first embodiment, the pointer 20' is shortened from the longer pointer 20, through the middle pointer 20". However, the shorter pointer 20' in FIG. 10C may be directly changed from the longer pointer 20 shown in FIG. 10A.

Further, in the first embodiment, the speedometer image is configured with the graduations 14a, 14b, characters 14c on the speedometer display area 14, and the pointer 20. The tachometer image is configured with the bar-graph indicator pattern 12a, characters 12b on the tachometer display area 12, and the segments 12c. However, the tachometer image may be configured with graduations 14a, 14b, characters 14c on the speedometer display area 14, and the pointer 20. The speedometer image may be configured with the bar-graph indicator pattern 12a, characters 12b on the tachometer display area 12, and the segments 12c.

Figure 11:
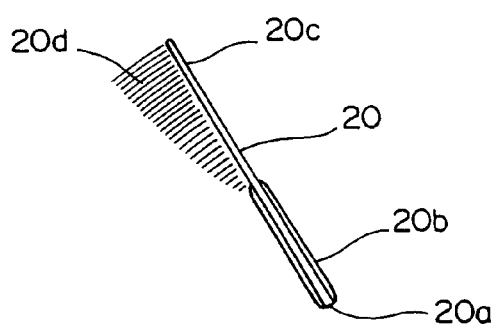
FIG. 11 is an explanatory view of an afterimage of the pointer image according to the first embodiment of this invention.

As shown in FIG. 11, when the pointer is moved according to the vehicle speed, an afterimage 20d may be displayed against a moving direction of the pointer 20. Thus, visibility of the movement of the pointer is improved, and a novel meter image can be displayed.

Data displayed on the auxiliary display area 15 is not limited to the warning. For example, a clinometer, a height control indicator, diagnostic data, a compass, a fuel meter, or an air condition may be displayed. Further, data displayed on the auxiliary display area 15 may be a dynamic image.

Second Embodiment

A second embodiment of the display apparatus for a vehicle according to this invention will be explained below with reference to figures.

Figure 12:
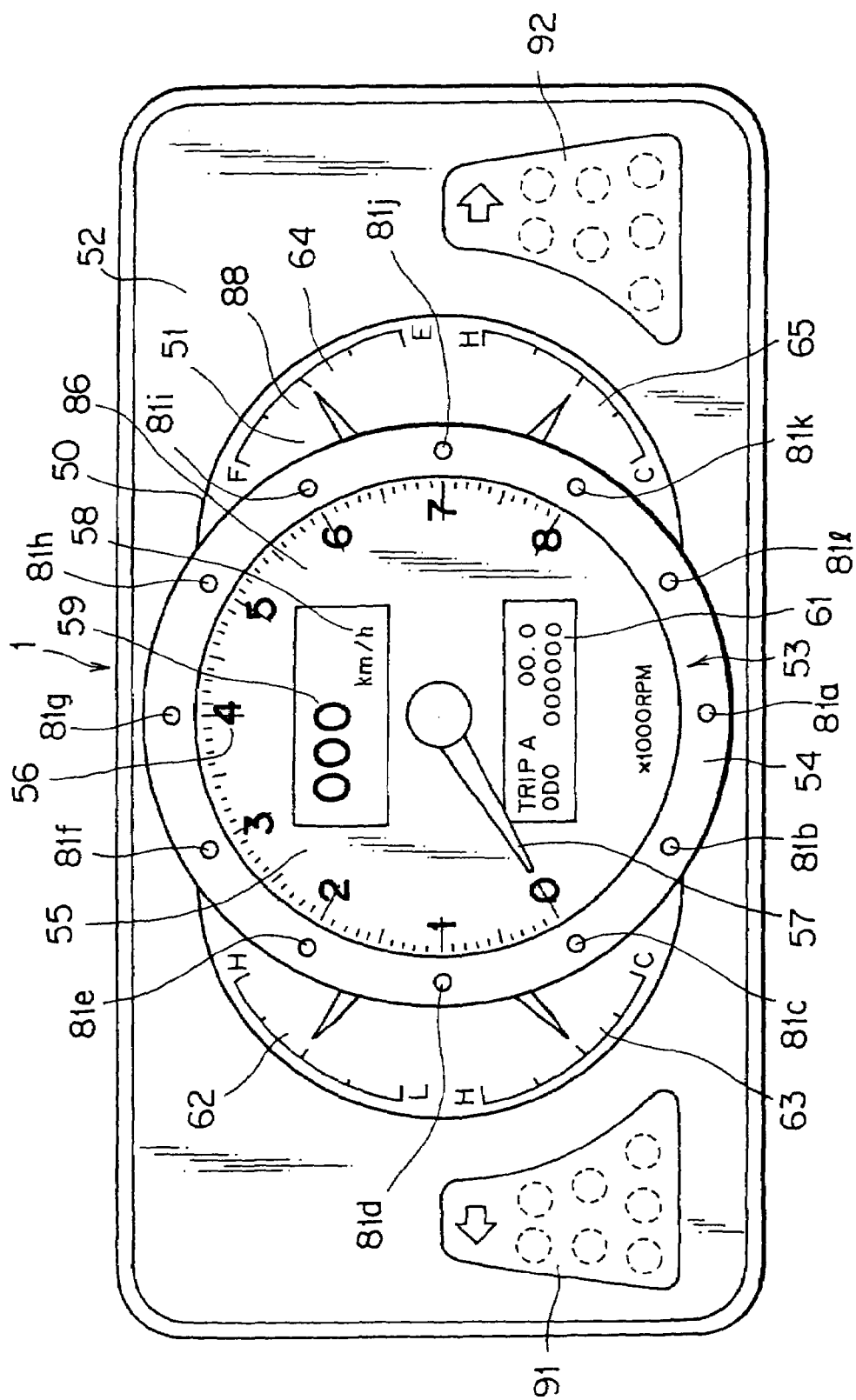
FIG. 12 is a front view showing a second embodiment of the display apparatus according to this invention.

As shown in FIG. 12, a full-graphic meter 50 is arranged in a center of a front surface of the display apparatus for a vehicle 1. Warning indicators are arranged at both sides of the full-graphic meter 50.

The full-graphic meter 50 includes an LCD 51, a bezel 52 for partially covering the LCD 51, and a partition mechanism 53 arranged in front of the LCD 51 and the bezel 52. The LCD 51 has a substantially rectangular shaped display screen 88, however, as shown in FIG. 12, the display screen 88 is partially covered by the bezel 52 having a substantially ellipse shape. Therefore, a viewing area of the display screen 88 has a substantially ellipse shape. Various data indicating driving conditions of the vehicle can be displayed on the LCD 51.

The partition mechanism 53 is provided in a substantially center of the substantially elliptic display screen 88. The partition mechanism 53 is made of an opaque plastic material, and includes a ring-shaped partition member 54 having a center circular opening, and a lens 55 fitted into the opening. The lens 55 may be concave or convex, and here the lens 55 is convex. Twelve LED emitters 81a to 81l are provided at substantially even intervals on the ring-shaped partition member 54.

A substantially circular dial image 56 indicating a driving state of the vehicle is displayed on a display area 86 via the opening of the ring-shaped partition member 54. The dial image 56 is a dial image of a tachometer, and graduations of the tachometer are displayed around an outer periphery of the tachometer. Further, a pointer 57 for indicating engine revolutions per minute is also displayed on the display area 86. An analog meter is configured with the dial image 56 and the pointer 57.

An auxiliary display area 58 for displaying other data except the tachometer data is provided at a center of the dial image 56. A digital speedometer display area 59 and a digital odometer and trip meter display area 61 is provided in the auxiliary display area 58.

An oil pressure meter display area 62 and an oil temperature meter display area 63 are provided in a substantially elliptic display area 88 of the LCD 51 surrounded by a right side outer periphery of the ring-shaped partition member 54 and the bezel 52.

A fuel meter display area 64 and a coolant temperature display area 65 are provided in a display area 88 of the LCD 51 surrounded by a left side outer periphery of the ring-shaped partition member 54 and the bezel 52.

Further, in the display apparatus for a vehicle 1, the partition mechanism 53 is movable in a major axis of the substantially elliptic display screen 88 of the LCD 51.

Figure 13:
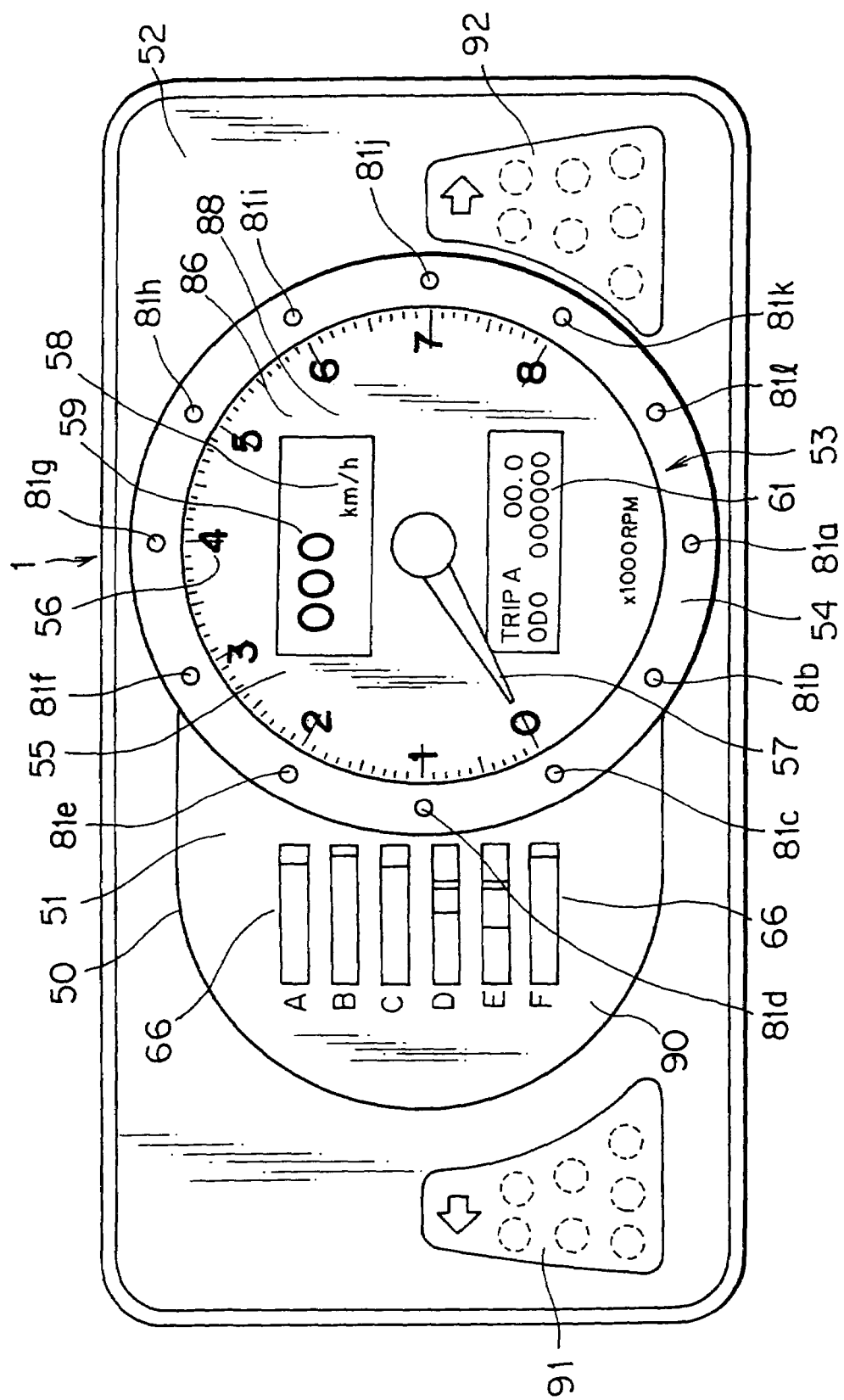
FIG. 13 is a front view of the display apparatus in FIG. 12 after moving a partition mechanism according to the second embodiment of this invention.

FIG. 13 shows the partition mechanism 53 after being moved from the substantially center to a right end of the display screen 88 of the LCD 51. The dial image 56 is also moved from the substantially center to the right end of the display screen 88 of the LCD 51 in synchronization with the movement of the partition mechanism 53. When the dial image 56 and the partition mechanism 53 are stopped, the dial image 56 is displayed through the opening of the ring-shaped partition member 54 as well as at the center of the display screen 88 of the LCD 51.

Upon starting the above-described movement of the partition mechanism 53 and the dial image 56, images displayed on the oil pressure meter display area 62, the oil temperature meter display area 63, the fuel meter display area 64, the coolant temperature display area 65 are deleted. Then, after moving the partition mechanism 53 and the dial image 56, data of the vehicle other than the previously displayed data (such as the oil pressure meter) is displayed on a display area 90 extending from the center to a left end of the display screen. For example, as shown in FIG. 13, status bars 66 of such as an oil level meter, a brake fluid meter, a coolant meter, an exhaust temperature meter, an intake gas temperature meter, a washer level meter, and the like are displayed on this display area 90.

Figure 16:
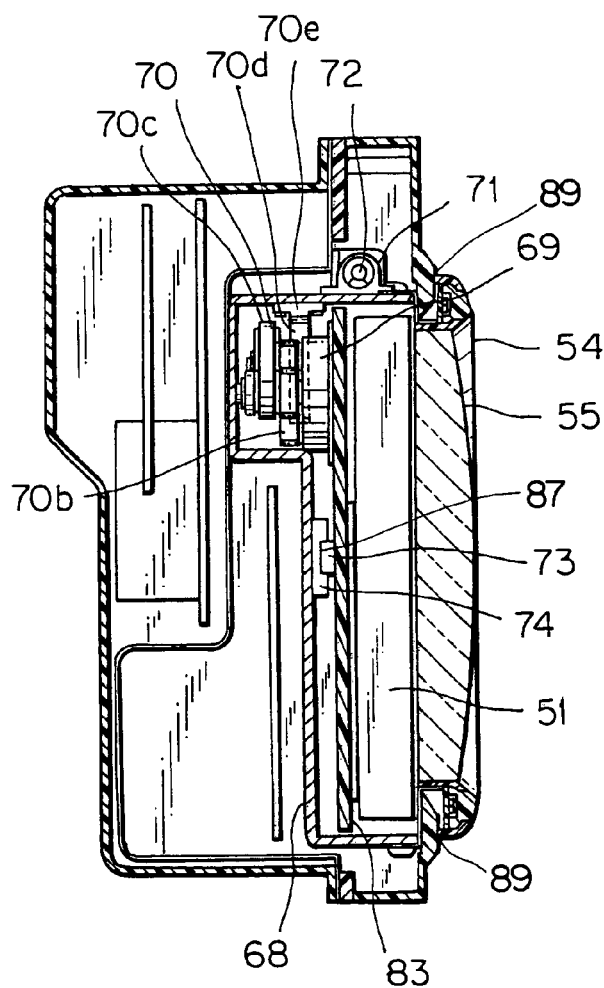
FIG. 16 is a perspective left side view for explaining the transfer mechanism according to the second embodiment of this invention.
Figure 14:
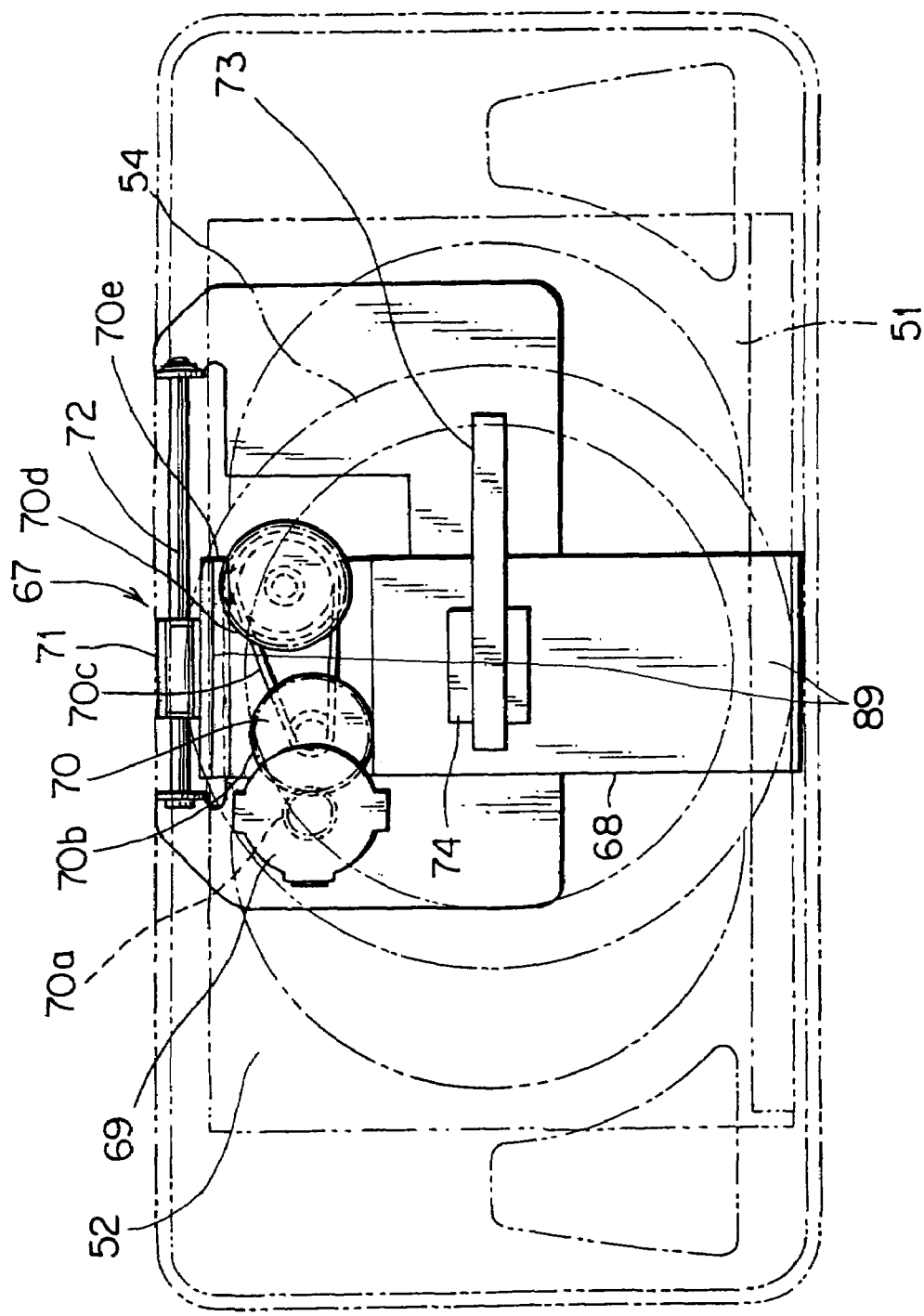
FIG. 14 is a perspective front view for explaining a transfer mechanism according to the second embodiment of this invention.
Figure 15:
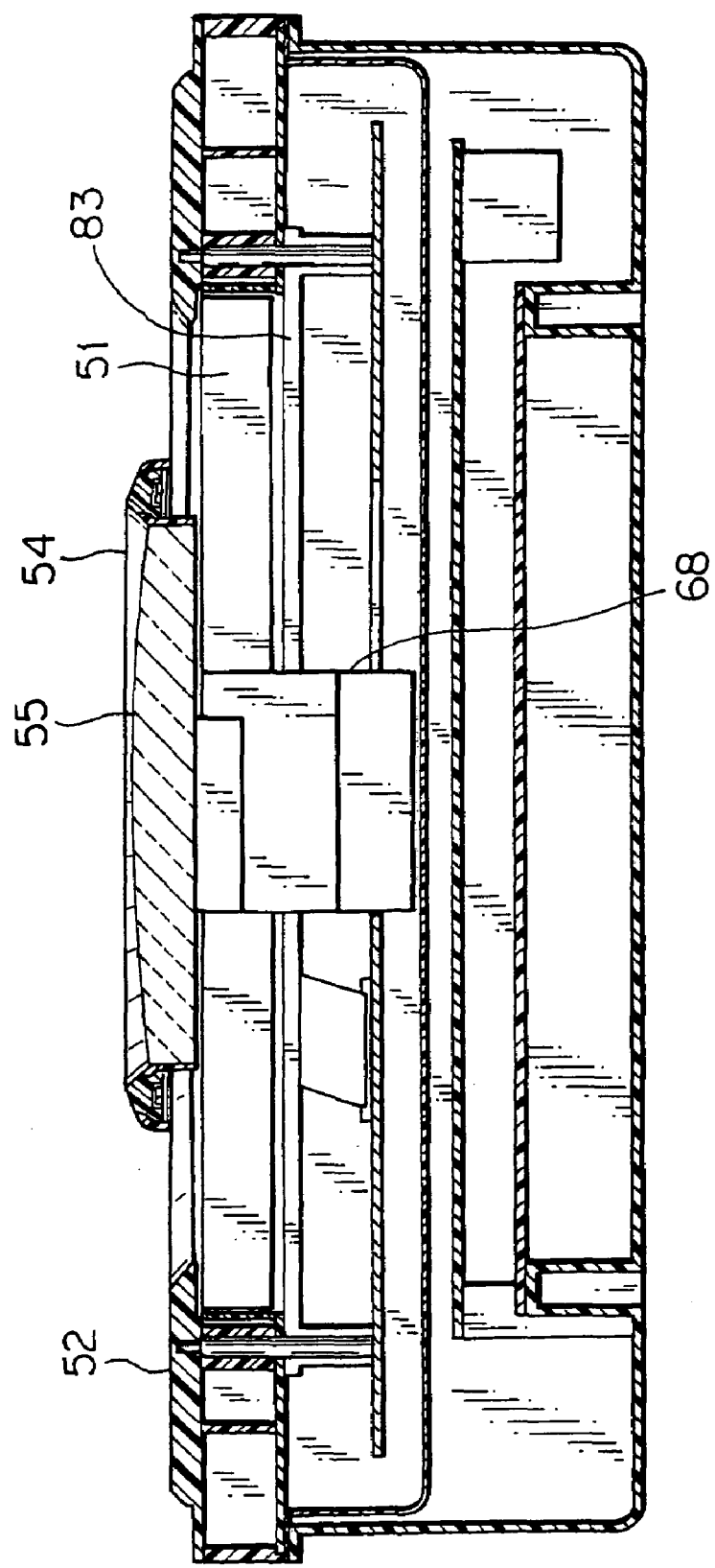
FIG. 15 is a perspective bottom view for explaining the transfer mechanism according to the second embodiment of this invention.

A composition of a transfer mechanism 67 for moving the partition mechanism 53 will be explained below with reference to FIGS. 14 to 16. The transfer mechanism 67 is provided at a back side of the bezel 52, and includes both ends respectively coupled to top and bottom parts of a back surface of the ring-shaped partition member 54 at upper and lower sides of the LCD 51; a bent frame 68 extending along a back surface of the LCD 51; a driving motor 69 provided at a back surface of a substrate 83 on which the LCD 51 is mounted; and a transmission 70 for transmitting a driving power of the motor 69 to the frame 68. The transfer mechanism 67 further includes a first support 71 for partially supporting the frame 68 at the upper side of the LCD 15; a shaft 72 mounted on a housing of the display apparatus for a vehicle 1 in a direction parallel to a major axis of the elliptic display screen 88, and on which the first support 71 is slidably fitted; a rail 73 disposed at the back surface of the substrate 83 in the direction parallel to the major axis of the elliptic display screen 88; and a second support 74 fixed to the frame 68, and on which a guiding groove 87 for guiding the rail 73 is formed.

The transmission 70 includes a gear 70a fixed to a rotation axis of the motor 69; a gear 70b meshing with the gear 70a; a pinion gear 70d to which a belt 70c transmits a rotation of the gear 70b; and a rack 70e for converting the rotation of the pinion gear 70d to a linear motion in a direction parallel to the major axis of the elliptic display screen 88.

Figure 17:
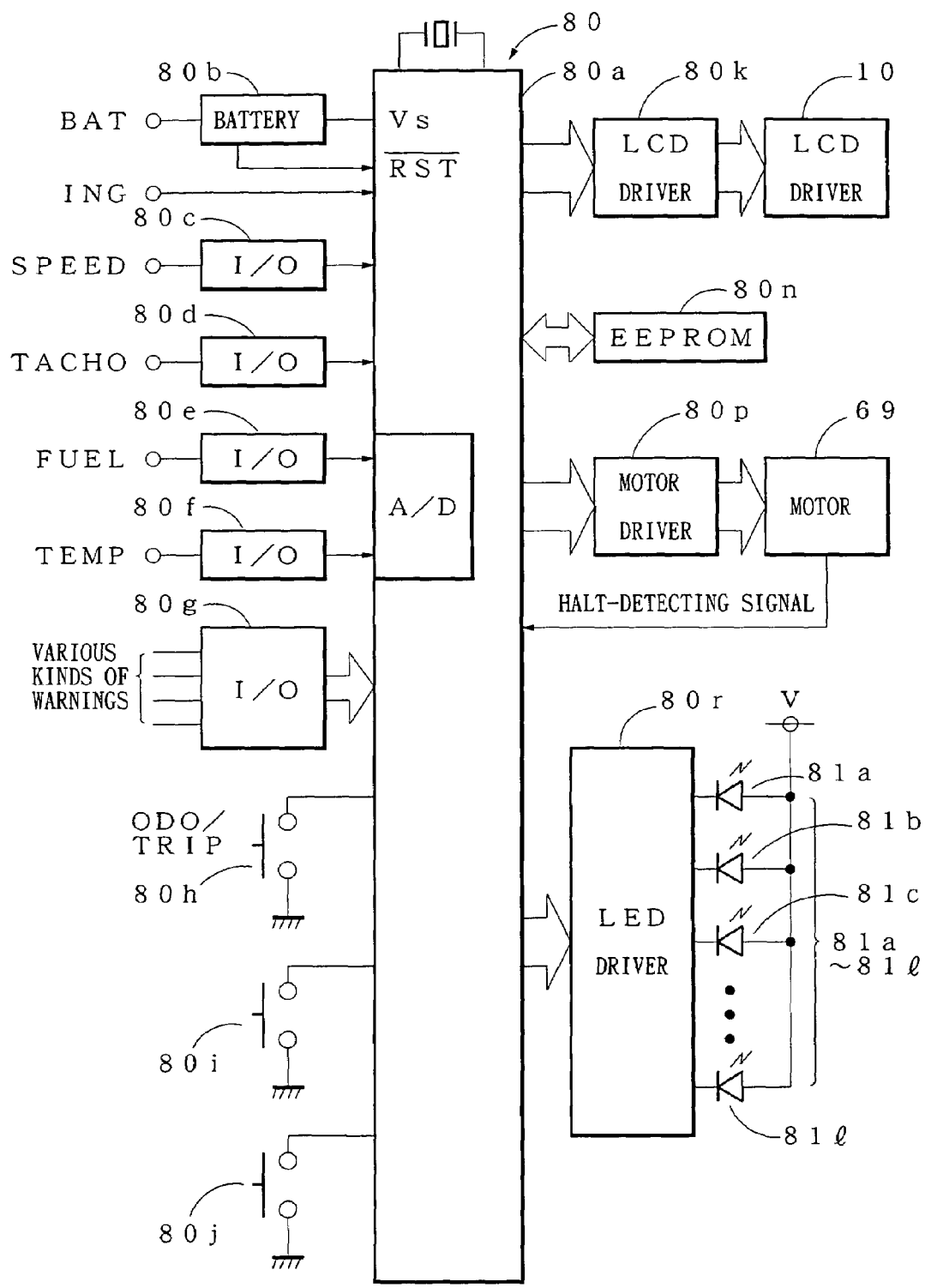
FIG. 17 is a block circuit diagram of the display apparatus according to the second embodiment of the invention.

FIG. 17 is a main block circuit diagram of a controller 80 mounted on the substrate 83 for controlling the image displayed on the full-graphic meter 50 of the display apparatus for a vehicle 1. This controller 80 includes a CPU 80a, a power supply circuit 80b connected to a not-shown battery for supplying the proper power to the CPU 80a, a first input/output circuit 80c for receiving a vehicle speed detecting (SPD) signal from a not-shown vehicle speed sensor; a second input/output circuit 80d for receiving an engine rotation number (TACHO) signal from a not-shown rotation sensor; a third input/output circuit 80e for receiving a fuel level signal from a not-shown fuel sensor; a fourth input/output circuit 80f from a coolant temperature sensor; a fifth input/output circuit 80g for receiving signals from the other sensors; a switch 80h for switching between the odometer and the trip meter; a switch 80i for moving the partition mechanism 53; a switch 80j for rotating light composed of a plurality of LEDs embedded in the ring-shaped partition member 54; an LCD driver 80k for receiving various display signals calculated and outputted by the CPU 80a from the above-described signals, and a TFT-LCD panel (full-graphic meter 50) driven by the LCD driver 80k; an EEPROM 80n; a motor driver 80p for driving the motor 69; and a driver 80r for driving the LCDs embedded in the ring-shaped partition member 54.

Figure 18:
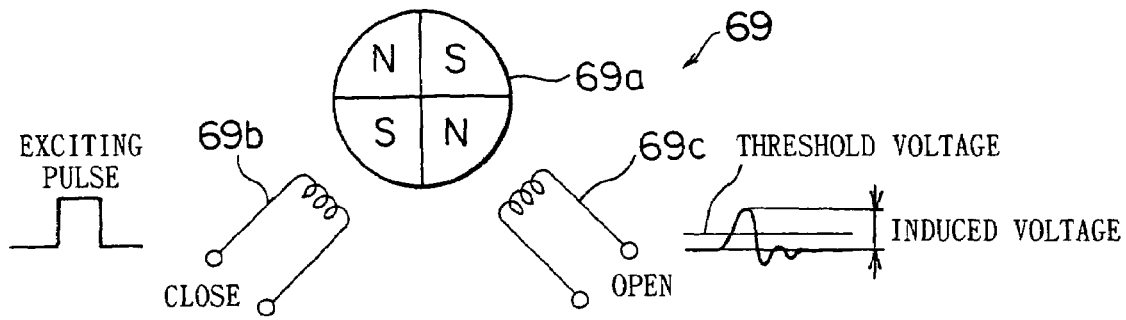
FIG. 18 is a schematic view showing a motor of the transfer mechanism according to the second embodiment of this invention.

The motor 69 is a stepper motor. In the stepper motor 69 as shown in FIG. 18, supplying a plurality of exciting pulses, which composes exciting steps, to an exciting coil 69b drives a rotor 69a having alternately polarized magnetic poles. Further, the stepper motor 69 includes an induced-voltage detecting coil 69c. This detecting coil 69c is in an open circuit, not in use for driving the rotor 69a, and generates the induced voltage corresponding to rotations of the rotor 69a. Whether the rotor 69a is rotated or not can be detected by whether the induced voltage is larger than a threshold voltage or not. Therefore, this induced voltage generated by the detecting coil 69c is applied to a halt-detecting signal of the motor 69, and inputted into the CPU 80a.

Further, the EEPROM 80n previously stores a standard number of exciting steps required for moving the ring-shaped partition member 54 from a start position to a stop position by the motor 69.

Figure 19:
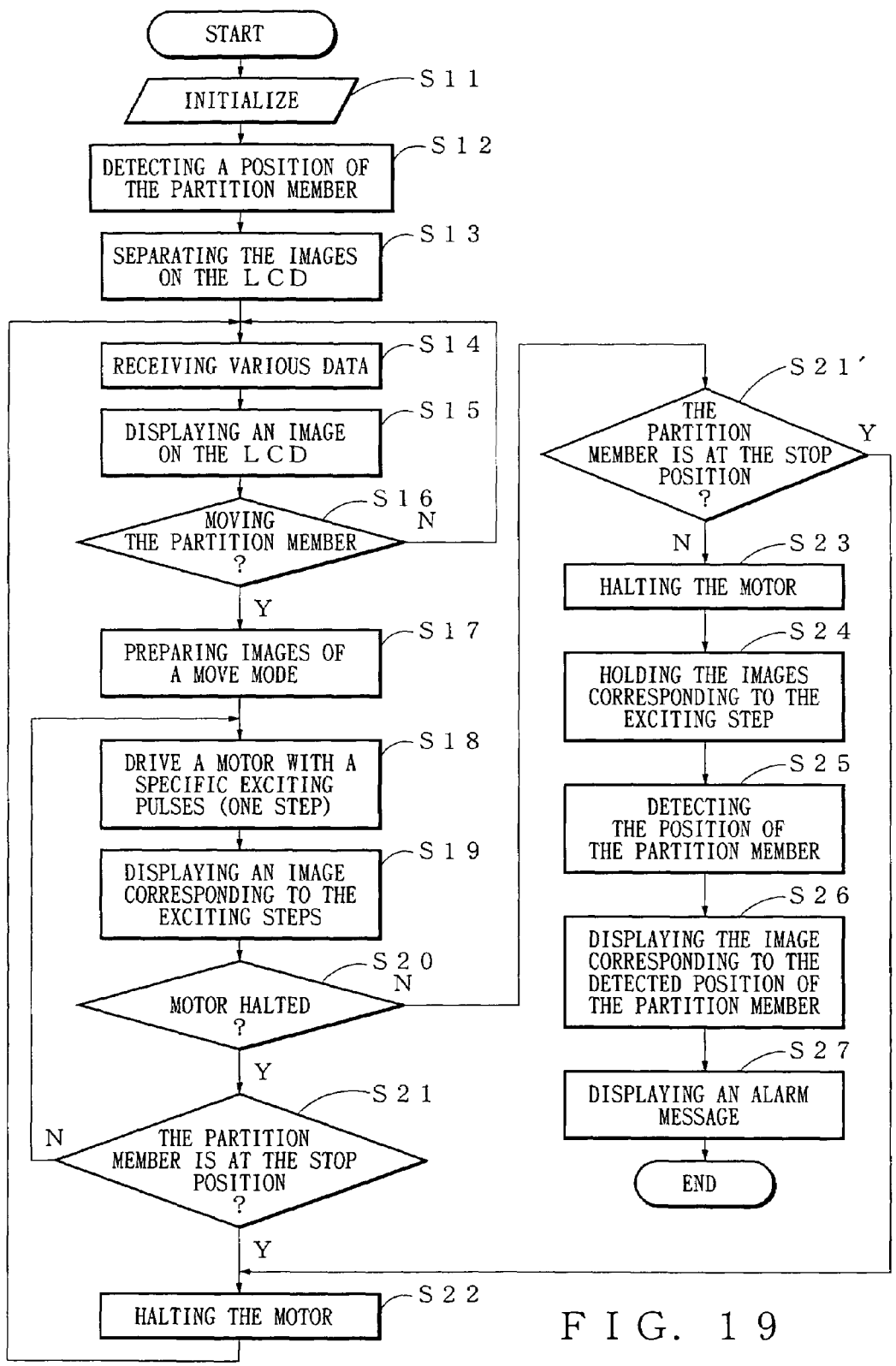
FIG. 19 is a flow chart showing a process flow of a controller according to the second embodiment of this invention.

A process flow of the CPU 80a in the above-described controller 80 will be explained with reference to FIG. 19. At first, in step S11, the power of the display apparatus for a vehicle 1 is on, and each part of the controller 80 is initialized.

Next, in step S12, a position of the ring-shaped partition member 54 is detected. Next, in step S13, the image displayed on the LCD 51 is separated. Next, in step S14, various detecting signals are inputted. Next, in step S15, an initial image is displayed on the display screen 88 of the full-graphic meter 50. This initial image is, for example, the image shown in FIG. 12, on which the dial image 56 and the pointer 57 are displayed corresponding to the rotation of the engine, and analog meters are displayed on the oil pressure meter display area 62, the oil temperature meter display area 63, the fuel meter display area 64, and the coolant temperature display area 65 corresponding to the respective measured value from the various sensors.

In this step S15, the images of the dial image 56 and the pointer 57 are surrounded by the ring-shaped partition member 54 and magnified by the magnifying lens 55. These magnified images look like being higher than the other images on the same display screen, and like independent stereoscopic images. Thereby, novel images can be displayed.

Next, in step S16, whether moving the ring-shaped partition member 54 is requested or not is judged. This judgement is based on a status of the manual switch 80i and a detection of an automatic emergency signal. This emergency signal is generated if, for example, a coolant temperature alarm signal is inputted from the input/output circuit 80f.

If the switch 80i is off, and the emergency signal is not generated, namely the CPU 80a judges "No" in step S16, the process flow returns to step S14. In this case, the various detecting signal inputs and the initial image are updated in step S14 and S15.

On the other hand, if the switch 80i is on, or the emergency signal is generated, namely the CPU 80a judges "Yes" in step S16, the process flow goes to step S17. In step S17, for replacing the images displayed on the LCD 51, images of a move mode previously stored in the EEPROM 80n are read out (but not displayed yet). This move mode is predetermined to either a constant speed mode or an increasing speed mode corresponding to a characteristic of the motor 69. In this embodiment, the move mode is configured to the increasing speed mode.

In such an increasing speed mode, movements of the images surrounded by the ring-shaped partition member 54 and the ring-shaped partition member 54 are completely synchronized from the start position to the stop position. Therefore, normal and comfortable meter images can be displayed. In case of the constant speed mode, a mismatch between the constant movement of the images and the increasing movement of the ring-shaped partition member 54 owing to the characteristic of the motor 69 is occurred at the stop time and the start time. Therefore, a character of the ring-shaped partition member 54 (mechanical part of the display apparatus for a vehicle 1) is emphasized in this constant speed mode.

Next, in step S18, the motor 69 starts to drive the ring-shaped partition member 54 a specific length (one exciting step) with specific exciting pulses. Accordingly, in the transfer mechanism 67, the rotation of the motor is transmitted to the pinion gear 70d via the gears 70a, 70b, and the belt 70c of the transmission 70. Then, the rotation of the pinion gear 70d is converted to a linear motion by the rack 70e, and the frame 68 is moved straight forward. In this case, the frame 68 is supported by the first support 71 slidably fitted on the shaft 72 and the second support 74 having the guiding groove 87 for guiding the rail 73. Therefore, the frame 68 is moved in the direction parallel to the major axis of the substantially elliptic display screen 88 of the LCD 51, namely, rightward in FIG. 12. As the movement of the frame 68, the ring-shaped partition member 54 attached to the partition mechanism 53 is moved similarly from the center to the right side of the display screen 88 of the LCD 51.

Next, in step S19, the images previously read out in step S17 are displayed corresponding to the exciting step. Thus, the images of the dial image 56 and the pointer 57 are moved from the center to the right side of the display screen 88 in synchronization with the movement of the ring-shaped partition member 54. Further, before the movement of the images of the dial image 56 and the pointer 57, the other images displayed on such as the oil pressure meter display area 62, the oil temperature meter display area 63, the fuel meter display area 64, and the coolant temperature display area 65 are deleted.

During a repetition of steps S17 to S21, the images of the dial image 56 and the pointer 57 are moved continuously in such a speed as to be visible. During the movement, the images of the dial image 56 and the pointer 57 are visible through the opening of the ring-shaped partition member 54.

Next, in step S20, whether a driving condition of the motor 69 is normal or not is judged. This judgement is based on a positional detection of the ring-shaped partition member 54, and a halt-detecting signal from the motor 69. For example, if the movement is interrupted by a trouble of the transfer mechanism 67, the motor 69 is halted and the level of the halt-detecting signal is less than the threshold voltage. Thereby, the CPU 80a judges the halt of the motor 69, and the process flow goes to step S21'. If the halt-detecting signal is more than the threshold voltage, the process flow goes to step S21.

In step S21', the CPU 80a compares a counting pulse number of the exciting pulses (or exciting steps) from the start position to a halt position counted by the CPU 80a, with a reference pulse number (or reference exciting steps), which is necessary for the ring-shaped partition member 54 to reach the stop point. If the counting pulse number is less than the reference pulse number, CPU 80a judges that the ring-shaped partition member 54 is halfway between the start and stop positions, because the pulse number of the exciting pulses is less than the reference pulse number, while the motor 69 is halted. Resultingly, the CPU 80a judges that the motor 69 is in trouble and goes to step S23. If the counting pulse number is equal to the reference pulse number, the process flow goes to step S22.

In step S21, the CPU 80a compares the counting pulse number of the exciting pulses (or exciting steps) counted by the CPU 80a, with the reference pulse number (or reference exciting steps). If the counting pulse number is less than the reference pulse number, CPU 80a judges that the ring-shaped partition member 54 is halfway between the start and stop positions, namely "No", and the process flow returns to step S18. If the CPU judges "Yes", the process flow goes to step S22. In step S22, the motor 69 is halted. After the halt of the motor 69, the process flow returns to step S14.

When the movement of the ring-shaped partition member 54 is ended, the images of the dial image 56 and the pointer 57 are visible via the opening of the ring-shaped partition member 54. Further, as shown in FIG. 13, status bars 66 of such as the oil level meter, the brake fluid meter, the coolant meter, the exhaust temperature meter, an intake gas temperature meter, a washer level meter, and the like are displayed on the display area 90, on which the dial image 56 and the pointer 57 were displayed in the initial image. If the emergency signal is generated in step S16 corresponding to an increase of the coolant temperature, the coolant temperature meter bar is displayed differently from the other meter bars to get a vehicle driver's attention. For example, the coolant temperature meter bar may blink or have a different color.

After the end of the movement of the ring-shaped partition member 54, when the switch 80i is on again, namely "Yes" in step S16, the ring-shaped partition member 54 reverts to the initial state shown in FIG. 12 by a counter rotation of the motor, and redrawn images according to steps 17 to 21.

On the other hand, if the motor 69 is judged to be in trouble in step S20', namely "No" in step S20', the process flow goes to step S23 and the power of the motor 69 is cutoff. Then, in step S24, the images of the dial image 56 and the pointer 57 corresponding to the exciting steps is held. Next, in step S25, the halt position of the ring-shaped partition member 54 is detected.

Next, in step S26, the images of the dial image 56 and the pointer 57 are displayed on the display screen of the LCD 51 at a position corresponding to the detected halt position of the ring-shaped partition member 54 to be visible via the opening of the ring-shaped partition member 54. Next, in step S27, a message about the motor trouble is displayed on the LCD 51.

According to the above, even if the movement of the ring-shaped partition member 54 is interrupted by such as a malfunction of the transfer mechanism 67, there is no mismatch between the position of the ring-shaped partition member 54 and the images of the dial image 56 and the pointer 57.

Thus, according to the second embodiment of this invention, a low-cost, vivid, stereoscopic, and novel display image can be attained. Further, the transfer mechanism 67 is covered by the bezel 52 and the LCD 51, the transfer mechanism 67 is prevented from being visible while the ring-shaped partition member 54 is moved. Therefore, an appearance of the full-graphic meter 50 is prevented from being spoiled.

Figure 20:
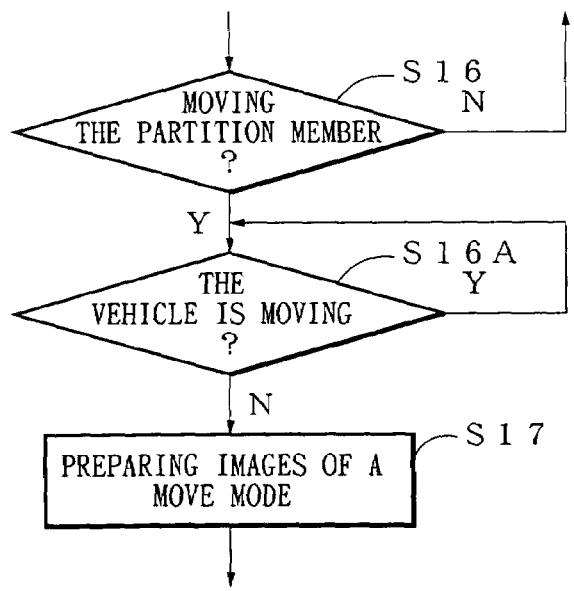
FIG. 20 is a part of a flow chart showing another process flow of the controller according to the second embodiment of this invention.

Having now fully described the second embodiment, however, this invention is not limited to these embodiments described above. For example, it is possible not to move the ring-shaped partition member 54 and the images of the dial image 56 and the pointer 57 while the vehicle is moving. Specifically, as shown in FIG. 20, step S16A, for judging whether the vehicle is moving or not, is inserted between step S16 and step S17 in FIG. 19. Thereby, the process flow may proceed to step S17 and to further steps only when the vehicle is moving. This judgement in step S16A is based on, for example, the speed detecting signal from the vehicle speed sensor.

Figure 21A:
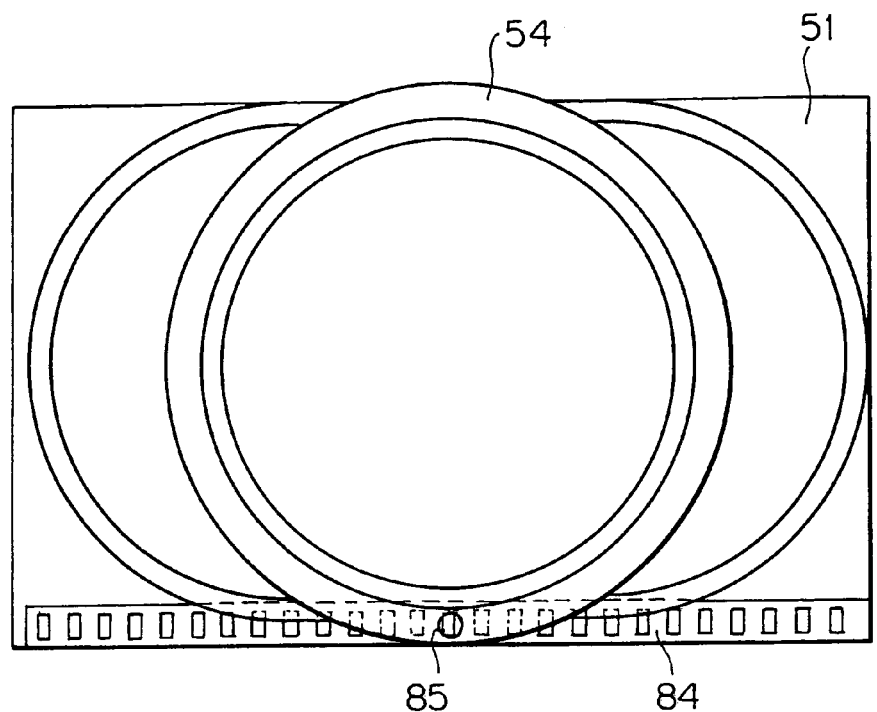
FIG. 21A is an explanatory view showing a position detecting system according to the second embodiment of this invention.
Figure 21B:
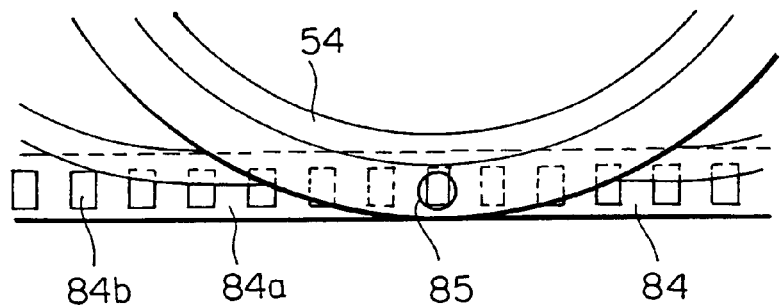
FIG. 21B is a partially enlarged view showing the position detecting system according to the second embodiment of this invention.

In the second embodiment, the stop position is detected by the counting pulse number (counting exciting steps) with reference to the reference pulse number (reference exciting steps). However, other detecting system can be employed. For example, as shown in FIG. 21, a position sensing marker, made of a dark bar 84a and a plurality of bright boxes 84b arranged in line inside the dark bar 84a, and each of which corresponds to a specific position of the display screen of the LCD 51, is displayed on a bottom part of the display screen of the LCD 51 covered by the bezel 52. Then, a photo sensor 85 mounted on a back side of the ring-shaped partition member 54 detects the bright boxes 84b. Thus, the stop position can be detected.

Figure 22:
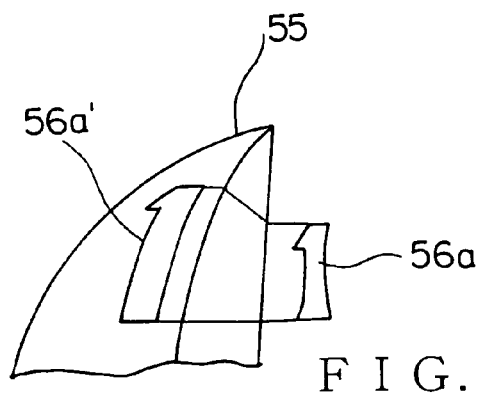
FIG. 22 is an explanatory view showing a compensation system for an image distortion caused by an aberration of a lens according to this invention.

In the second embodiment, the convex magnifying lens 55 is fitted into the opening of the ring-shaped partition member 54, and the dial image 56 is magnified visually. However, numerical scales provided around the outer periphery of the dial image 56 are visually distorted by aberration of an outer periphery of the magnifying lens 55. So, as shown in FIG. 22, the CPU 80a may previously distorted the numeral scales 56a displayed on the display screen of the LCD 51 for compensating the distortion caused by the aberration of the magnifying lens 55. Thus, magnified numeral scales 56a' without distortions can be visible through the magnifying lens 55.

In the second embodiment, in the images of the dial image 56 and the pointer 57, the tachometer and the speedometer are respectively displayed as an analog meter and a digital meter. However, instead of these images, the tachometer and the speedometer may be respectively displayed as a digital meter and an analog meter.

Further, these two combination images of the tachometer and the speedometer may be alternately displayed by a manual switch at any time. Further, these combination images may be alternately displayed at the start position and the stop position.

In the second embodiment, the motor 69 as a driving source is fixed on the substrate, and the rack 70e is fixed on the frame 68. Instead of this, the motor 69 may be fixed on the frame 68, and the rack 70e may be fixed on the substrate.

In the second embodiment, a gear belt drive is used in the transmission 70. However, other drive such as a screw drive may be used in the transmission 70.

In the second embodiment, the movement of the ring-shaped partition member 54 is visible. In addition, the movement may audible by providing a sound effect generator controlled by the CPU 80a for generating sound such as a buzz sound from the start to the stop of the movement.

In the second embodiment, as shown in FIG. 13, when the movement of the ring-shaped partition member 54 is stopped, the status bars 66 of such as an oil level meter, a brake fluid meter, a coolant meter, an exhaust temperature meter, an intake gas temperature meter, a washer level meter, and the like are displayed on the display area 90. However, instead of them, navigating data of a car-mounted navigation system, or a rear view of a vehicle rear view system may be displayed on the display area 90.

In the second embodiment, only one LCD 51 is used as a display of the display apparatus for a vehicle 1. However, another display may be used as an auxiliary display. The auxiliary display may be visible through the opening of the ring-shaped partition member 54 and slidable on the display screen of the LCD 51 by the transfer mechanism 67.

In the second embodiment, an LCD is used as a display of the display apparatus for a vehicle 1. However, other displays such as an organic EL or a plasma display may be used for the display of the display apparatus for a vehicle 1.

In the second embodiment of the invention, the emergency signal is generated by receiving a coolant temperature alarm signal from the input/output circuit 80f. However, the emergency signal may be generated by receiving a tire pressure alarm signal from the input/output circuit 80g. In this case, a general-view image of the vehicle and images of the tires are displayed on the display area 90. Further, the image of a tire indicating a lower pressure trouble may be displayed differently form the images of the other tires to get a driver's attention. For another example, when receiving a half-shut door alarm signal or a sheet belt alarm signal from the input/output circuit 80g, the CPU 80a may move the ring-shaped partition member 54 to the stop position and display a proper image on the display area 90 for getting a driver's attention.

In the second embodiment, the ring-shaped partition member 54 is made of a plastic material. However, the ring-shaped partition member 54 may be made of other material such as metal.

Figure 23:
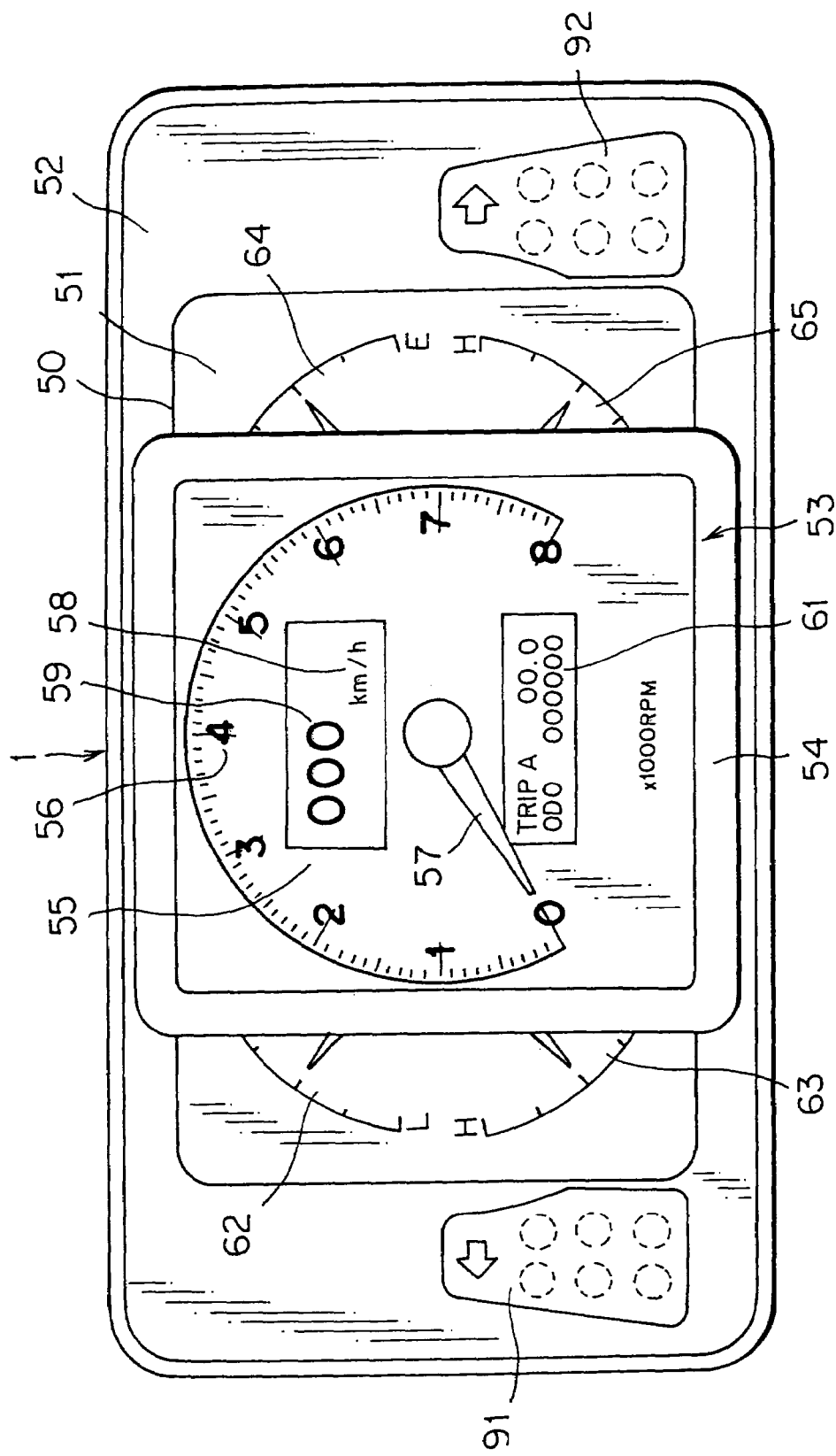
FIG. 23 is a front view showing another partition member according to this invention.
Figure 25A:
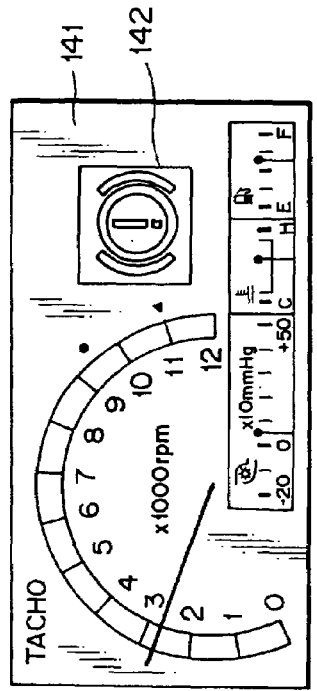
FIGS. 25A and 25B are example images displayed on the display of the conventional display apparatus for a vehicle.
Figure 25B:
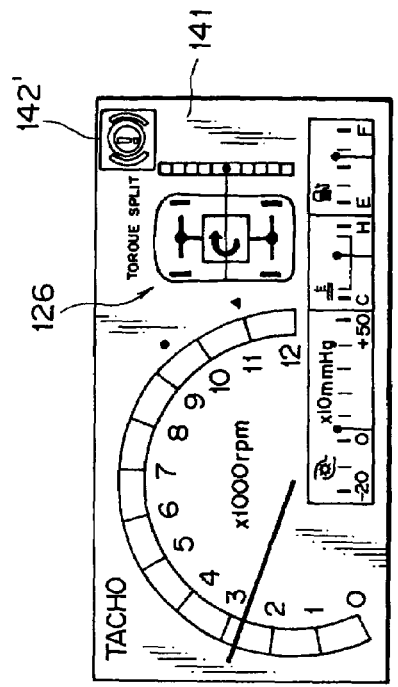
Figure 24A:
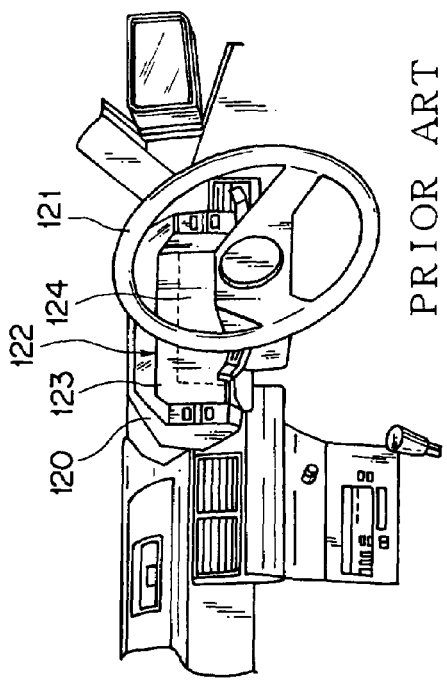
FIG. 24A is an overall schematic view showing a conventional display apparatus for a vehicle.
Figure 24B:
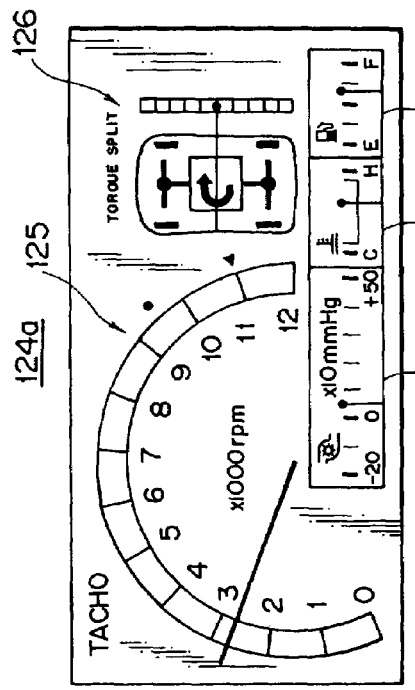
FIG. 24B is a schematic view showing an example image displayed on a display screen of the conventional display apparatus for a vehicle.
Figure 26:
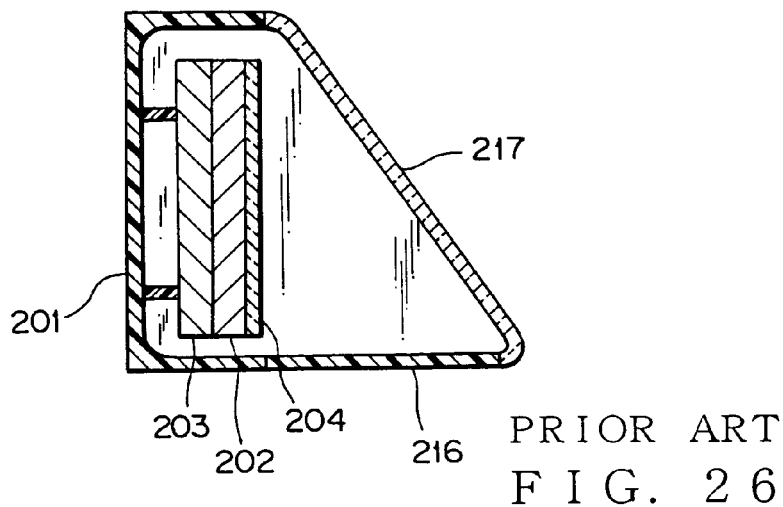
FIG. 26 is a vertical sectional side view showing another conventional display apparatus for a vehicle.
Figure 27A:
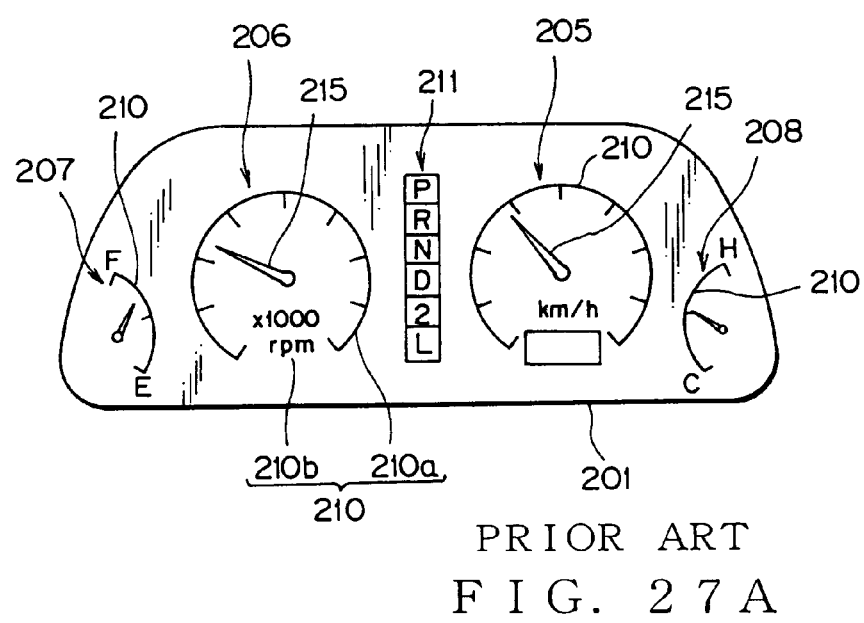
FIG. 27A is a front view showing an example image having analog meters displayed on a display screen of the another conventional display apparatus for a vehicle.
Figure 27B:
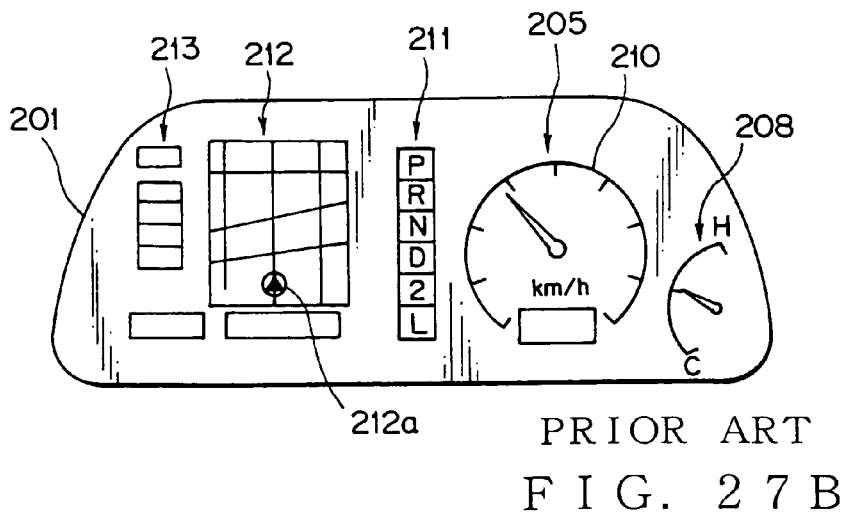
FIG. 27B is a front view showing an example image having some of the analog meters and car-navigation information displayed on the display screen of the another conventional display apparatus for a vehicle.

In the second embodiment, the ring-shaped partition member 54 has a circular shape. However, the ring-shaped partition member 54 may have a square shape as shown in FIG. 23, a polygon shape, a semicircular and partially straight shape, or the like for partitioning the display screen of the full-graphic meter 50.

According to this invention, as shown in FIG. 1, since the partition member 21 is mounted on a part of the display area 16, stereoscopic and vivid images are displayed on the display screen 16 of the display apparatus for a vehicle 1 at low cost.

According to this invention, as shown in FIG. 1, since the display area 16 includes a meter display area 14 displaying an image corresponding to a dial plate indicating measured value of a vehicle driving condition, and an auxiliary display area 15 displaying other data except the measured value, and since the partition member 21 is mounted on a part of the meter display area 14, further stereoscopic and vivid images are displayed on the display screen 16 at low cost.

According to this invention, since the partition member 21 is transparent, and has a lens effect, further stereoscopic and vivid images are displayed on the display screen 16.

According to this invention, since the partition member is made of a plastic material, the display apparatus for a vehicle 1 is produced at low cost.

According to this invention, since both sides of the partition member 21 made of a plastic are metalized, a novel appearance of the display screen 16 is attained.

According to this invention, as shown in FIG. 10, since the controller 40 so controls as to normally extend the pointer image 20 indicating the measured value from the meter display area 14 to the auxiliary display area 15, and as to shorten the pointer image 20 when the other data except the measured value is displayed on the auxiliary display area 15, the visibility of the display screen 16 is improved.

According to this invention, since the images displayed on the auxiliary display area 15 are gradated, further stereoscopic images are displayed on the display screen 16.

According to this invention, since the partition member 54 has a ring-like shape, and the lens 55 is mounted on a center opening of the ring-shaped partition member 54, a part of the images displayed on the display area 88 looks as if it has a different height from other images, so that further stereoscopic images are displayed on the display screen 88.

According to this invention, since the controller 40 controls to compensate a distortion of an image being displayed on the display screen 16, and caused by aberration of the lens, a distortion-free image can be displayed on the display screen 16.

According to this invention, since the partition member 21 is made of an opaque plastic material, or metal, further stereoscopic, and metallic images are displayed on the display area 16.

Having now fully described the invention, it will be apparent to one of ordinary skill in the art that many changes and modifications can be made thereto without departing from the scope of the invention as set forth herein.

What is claimed is:

1. A display apparatus for a vehicle comprising:
   a display screen having a plurality of display areas on which data indicating various conditions of the vehicle are displayed;
   a controller for controlling images displayed on the display screen; and
   a partition member mounted on a part of the display areas, wherein the partition member is a ring member having an opening at its center, and wherein a lens is mounted at the center opening of the partition member.

2. The display apparatus for a vehicle as claimed in claim 1,
   wherein the display areas include a meter display area on which a dial plate image indicating a measured value representing one aspect of a vehicle driving condition is displayed; and an auxiliary display area on which information other than the measured value is displayed, wherein the partition member is mounted on a part of the meter display area.

3. The display apparatus for a vehicle as claimed in claim 1,
   wherein the partition member is made of a transparent material formed to have a lens effect.

4. The display apparatus for a vehicle as claimed in claim 3,
   wherein the transparent material is a plastic material.

5. The display apparatus for a vehicle as claimed in claim 1, wherein both sides of the partition member are metallized.

6. The display apparatus for a vehicle as claimed in claim 2,
   wherein the controller so controls as to normally extend a pointer image for indicating the measured value from the meter display area to the auxiliary display area, and as to shorten the pointer image when the information other than the measured value is displayed on the auxiliary display area.

7. The display apparatus for a vehicle as claimed in claim 2,
   wherein images displayed on the auxiliary display area are graduated.

8. The display apparatus for a vehicle as claimed in claim 1, wherein the controller controls to compensate a distortion caused by aberration of the lens, of an image on the display screen viewed through the lens.

9. The display apparatus for a vehicle as claimed in claim 1,
   wherein the partition member is made of an opaque plastic material, or a metal.

* * * * *